(12) United States Patent
Chen et al.

(10) Patent No.: US 9,778,784 B2
(45) Date of Patent: *Oct. 3, 2017

(54) TOUCH DISPLAY DRIVING CIRCUIT CAPABLE OF RESPONDING TO CPU COMMANDS

(71) Applicant: Rich IP Technology Inc., Taipei (TW)

(72) Inventors: Han-Chang Chen, New Taipei (TW); Chung-Lin Chia, Taoyuan (TW); Chih-Wen Wu, Miaoli County (TW); Yen-Hung Tu, Taipei (TW); Jen-Chieh Chang, New Taipei (TW)

(73) Assignee: RICH IP TECHNOLOGY INC., Taipei (TW)

( * ) Notice: Subject to any disclaimer, the term of this patent is extended or adjusted under 35 U.S.C. 154(b) by 66 days.

This patent is subject to a terminal disclaimer.

(21) Appl. No.: 14/875,161

(22) Filed: Oct. 5, 2015

(65) Prior Publication Data

US 2016/0026331 A1    Jan. 28, 2016

Related U.S. Application Data

(63) Continuation-in-part of application No. 13/803,524, filed on Mar. 14, 2013, now Pat. No. 9,176,613.

(51) Int. Cl.

| | | |
|---|---|---|
| *G06F 3/041* | (2006.01) | |
| *G06F 3/038* | (2013.01) | |
| *G06F 3/044* | (2006.01) | |
| *G06F 3/0488* | (2013.01) | |

(Continued)

(52) U.S. Cl.
CPC ............ *G06F 3/0416* (2013.01); *G06F 3/038* (2013.01); *G06F 3/0418* (2013.01); *G06F 3/0488* (2013.01); *G06F 3/14* (2013.01); *G06F 3/044* (2013.01); *G06F 3/0412* (2013.01);

(Continued)

(58) Field of Classification Search
None
See application file for complete search history.

(56) References Cited

U.S. PATENT DOCUMENTS 8,823,657 B2 * 9/2014 Wilson .................. G06F 3/0416
                                                          345/173
8,922,529 B2 * 12/2014 Kim ....................... G06F 3/0433
                                                          345/156

(Continued)

*Primary Examiner* — Dismery Mercedes
(74) *Attorney, Agent, or Firm* — Ming Chow; Sinorica, LLC

(57) ABSTRACT

A touch display driving circuit capable of responding to CPU commands, including: a first interface receiving touch configuration data from a CPU and outputting touch report data to the CPU; a second interface coupling with a touch display module; a control unit executing a touch detection procedure on the touch display module via the second interface to derive touch detected data, and processing the touch detected data to generate the touch report data, wherein the touch detection procedure is determined according to the touch configuration data determining a connection configuration of at least one multiplexer and a weighting configuration of at least one touch point, and the content of the touch report data include a sensed pressure profile, a finger print, a palm print, an ear image, characteristics of a finger print, characteristics of a palm print, or characteristics of an ear image.

20 Claims, 26 Drawing Sheets

(51) Int. Cl.
*G06F 3/14* (2006.01)
*G09G 5/00* (2006.01)

(52) U.S. Cl.
CPC ........... *G06F 3/0414* (2013.01); *G09G 5/003* (2013.01); *G09G 2354/00* (2013.01)

(56) References Cited

U.S. PATENT DOCUMENTS

| | | | | |
|---|---|---|---|---|
| 8,941,394 | B2* | 1/2015 | Martin | G06F 3/0418 324/658 |
| 9,335,843 | B2* | 5/2016 | Kim | G06F 3/041 |
| 9,430,076 | B2* | 8/2016 | Chen | G06F 3/0412 |
| 2008/0165154 | A1* | 7/2008 | Kim | G06F 3/0488 345/173 |
| 2009/0303231 | A1* | 12/2009 | Robinet | G06F 3/04815 345/419 |
| 2010/0110040 | A1* | 5/2010 | Kim | G06F 3/0412 345/174 |
| 2011/0080430 | A1* | 4/2011 | Nishibe | G06F 3/04883 345/661 |
| 2011/0175826 | A1* | 7/2011 | Moore | G06F 3/04886 345/173 |
| 2011/0193817 | A1* | 8/2011 | Byun | G06F 3/0418 345/174 |
| 2011/0260990 | A1* | 10/2011 | Ali | G06F 3/016 345/173 |
| 2012/0001862 | A1* | 1/2012 | Durbin | G06F 1/1601 345/174 |
| 2012/0105424 | A1* | 5/2012 | Lee | G09F 9/35 345/212 |
| 2012/0162088 | A1* | 6/2012 | van Lieshout | G06F 3/0412 345/173 |
| 2012/0268415 | A1* | 10/2012 | Konovalov | G06F 3/044 345/174 |
| 2012/0293447 | A1* | 11/2012 | Heng | G06F 3/0418 345/174 |
| 2013/0100076 | A1* | 4/2013 | Tu | H04N 5/23203 345/175 |
| 2013/0113753 | A1* | 5/2013 | Lee | G06F 3/0418 345/174 |
| 2013/0249807 | A1* | 9/2013 | You | G06F 3/04815 345/173 |
| 2014/0062893 | A1* | 3/2014 | Kawalkar | G06F 3/0488 345/173 |
| 2014/0139431 | A1* | 5/2014 | Tseng | G06F 3/0488 345/158 |
| 2014/0160085 | A1* | 6/2014 | Rabii | G06F 1/3262 345/178 |

* cited by examiner

TOUCH DISPLAY DRIVING CIRCUIT CAPABLE OF RESPONDING TO CPU COMMANDS

INCORPORATION BY REFERENCE

This is a continuation in part application to application Ser. No. 13/803,524 "TOUCH DISPLAY DRIVING CIRCUIT CAPABLE OF RESPONDING TO CPU COMMANDS" which was filed on Mar. 14, 2013, and which is incorporated herein by reference in its entirety.

FIELD OF THE INVENTION

The present invention relates to a driving circuit for a touch display, especially to a touch display driving circuit capable of responding to CPU (central processing unit) commands.

DESCRIPTION OF THE RELATED ART

Please refer to FIG. 1, which illustrates a block diagram of a prior art driving structure for a touch display. As illustrated in FIG. 1, a driving circuit 100, in which a micro processor or a micro controller is included, receives pixel data $D_{IMG}$ from a CPU 110 via an image data interface 101, and generates a set of pixel driving signals SDIsp according to the pixel data DIMG to drive a touch display module 120, and thereby display an image. Besides, the driving circuit 100 drives the touch display module 120 via a set of touch signals STP to derive touch data $D_{TOUCH}$, and transmits the touch data $D_{TOUCH}$ to the CPU 110 via a touch data interface 102.

In touch applications of simple functions or small sizes, the micro processor or micro controller in the driving circuit 100 of prior art needs not to be very powerful to handle a task involved in the touch applications. However, as the demands for touch function become complex, the micro processor or micro controller in the driving circuit 100 may no longer afford the loading of a complex task demand. One solution is to use a powerful micro processor or micro controller in the driving circuit 100. However, this will increase the cost of the driving circuit 100 and affect the competitiveness of a touch product resulted thereby.

To solve the foregoing problem, a novel touch display driving circuit architecture is needed.

SUMMARY OF THE INVENTION

One objective of the present invention is to disclose a driving circuit capable of configuring and executing a touch detection procedure according to a CPU's commands.

Another objective of the present invention is to disclose a driving circuit capable of receiving touch configuration data from a CPU, wherein the touch configuration data includes multiple control bits for determining a connection configuration of at least one multiplexer, and a weighting configuration of at least one touch point.

Another objective of the present invention is to disclose a driving circuit capable of receiving touch configuration data from a CPU, wherein the touch configuration data includes at least one control bit for enabling/disabling at least one touch point.

Another objective of the present invention is to disclose a driving circuit capable of receiving touch configuration data from a CPU, and using the touch configuration data to execute a resistor-capacitor delay compensation function.

Another objective of the present invention is to disclose a driving circuit capable of receiving touch configuration data from a CPU, and using the touch configuration data to execute a dynamic driving function.

Another objective of the present invention is to disclose a driving circuit capable of receiving touch configuration data from a CPU, and using the touch configuration data to execute an adaptive driving function. Another objective of the present invention is to disclose a driving circuit capable of receiving touch configuration data from a CPU, and using the touch configuration data to execute a multi-stage driving function.

Another objective of the present invention is to disclose a driving circuit capable of receiving touch configuration data from a CPU, and using the touch configuration data to execute a three-dimensional touch detection function.

Another objective of the present invention is to disclose a driving circuit capable of receiving touch configuration data from a CPU, and using the touch configuration data to execute a GUI (graphical user interface) touch detection function.

Another objective of the present invention is to disclose a driving circuit capable of configuring a touch resolution profile and a touch sensitivity profile according to a CPU's commands so as to facilitate detecting a pressure profile on a touch operation area and/or a change of the pressure profile over time.

Another objective of the present invention is to disclose a driving circuit capable of configuring a touch resolution profile and a touch sensitivity profile according to a CPU's commands so as to facilitate detecting a finger print of a user and/or characteristic data thereof.

Another objective of the present invention is to disclose a driving circuit capable of configuring a touch resolution profile and a touch sensitivity profile according to a CPU's commands so as to facilitate detecting a palm print of a user and/or characteristic data thereof.

Another objective of the present invention is to disclose a driving circuit capable of configuring a touch resolution profile and a touch sensitivity profile according to a CPU's commands so as to facilitate detecting an ear image of a user and/or characteristic data thereof.

To attain the foregoing objectives, a touch display driving circuit capable of responding to CPU commands is proposed, the touch display driving circuit including:

a first interface for receiving pixel data and touch configuration data from a CPU;

a second interface for coupling with a touch display module; and a control unit, which drives the touch display module via the second interface to show an image according to the pixel data, and executes a touch detection procedure on the touch display module via the second interface, wherein the touch detection procedure is determined according to the touch configuration data.

In one embodiment, the touch display driving circuit capable of responding to CPU commands further includes a third interface for transmitting touch data to the CPU, wherein the touch data is derived by the control unit during an execution of the touch detection procedure.

In one embodiment, the control unit includes a timing control unit, a source driver unit, a gate driver unit, a touch driver unit, and a touch detection unit.

In one embodiment, the control unit further includes a memory unit for storing the touch data.

In one embodiment, the touch display driving circuit capable of responding to CPU commands is implemented by a single integrated circuit.

In one embodiment, the touch display driving circuit capable of responding to CPU commands is implemented by multiple integrated circuits.

In one embodiment, the touch display module has a flat panel display and a touch array.

In one embodiment, the flat panel display is one selected from a group consisting of a thin-film-transistor display, an organic-light-emitting-diode display, a nanometer-carbon-tube display, a super-twisted-nematic display, and a field-emission display.

In one embodiment, the touch array is one selected from a group consisting of a capacitive type touch array, a resistive type touch array, an optical type touch array, an acoustic type touch array, a pressure sensing type touch array, and a radar type touch array.

In one embodiment, the first interface transmits data in a serial manner or a parallel manner.

In one embodiment, the touch configuration data includes multiple control bits.

In one embodiment, the multiple control bits included in the touch configuration data are used to determine a connection configuration of at least one multiplexer, and a weighting configuration of at least one touch point.

In one embodiment, the multiple control bits included in the touch configuration data are further used to enable/disable at least one touch point.

In one embodiment, the control unit uses the touch configuration data to execute the touch detection procedure to provide a resistor-capacitor delay compensation function.

In one embodiment, the control unit uses the touch configuration data to execute the touch detection procedure to provide a dynamic driving function.

In one embodiment, the control unit uses the touch configuration data to execute the touch detection procedure to provide an adaptive driving function.

In one embodiment, the control unit uses the touch configuration data to execute the touch detection procedure to provide a multi-stage driving function.

In one embodiment, the control unit uses the touch configuration data to execute the touch detection procedure to provide a three-dimensional touch detection function.

In one embodiment, the control unit uses the touch configuration data to execute the touch detection procedure to provide a GUI (graphical user interface) touch detection function.

To attain the foregoing objectives, another touch display driving circuit capable of responding to CPU commands is proposed, the touch display driving circuit including:

a first interface for receiving touch configuration data from a CPU;

a second interface for coupling with a touch module; and a control unit, which drives the touch module via the second interface to execute a touch detection procedure, wherein the touch detection procedure is determined according to the touch configuration data.

In one embodiment, the touch display driving circuit capable of responding to CPU commands further includes a third interface for transmitting touch data to the CPU, wherein the touch data is derived by the control unit during an execution of the touch detection procedure.

In one embodiment, the touch module has a touch array, which is one selected from a group consisting of a capacitive type touch array, a resistive type touch array, an optical type touch array, an acoustic type touch array, a pressure sensing type touch array, and a radar type touch array.

In one embodiment, the touch display driving circuit capable of responding to CPU commands is implemented by a single integrated circuit.

In one embodiment, the touch display driving circuit capable of responding to CPU commands is implemented by multiple integrated circuits.

In one embodiment, the first interface transmits data in a serial manner or a parallel manner.

In one embodiment, the touch configuration data includes multiple control bits.

In one embodiment, the multiple control bits included in the touch configuration data are used to determine a connection configuration of at least one multiplexer, and a weighting configuration of at least one touch point.

In one embodiment, the multiple control bits included in the touch configuration data are further used to enable/disable at least one touch point.

To attain the foregoing objectives, another touch display driving circuit capable of responding to CPU commands is proposed, including:

a first interface for receiving pixel data and touch configuration data from a CPU and outputting touch report data to the CPU, wherein the first interface transmits data in a serial manner or a parallel manner and the touch configuration data includes multiple control bits;

a second interface for coupling with a touch display module;

a control unit, which drives the touch display module via the second interface to show an image according to the pixel data, executes a touch detection procedure on the touch display module via the second interface to derive touch detected data, and processes the touch detected data to generate the touch report data, wherein the touch detection procedure is determined according to the touch configuration data, the multiple control bits included in the touch configuration data are used to determine a connection configuration of at least one multiplexer to set a touch resolution profile, and a weighting configuration of at least one touch point to set a touch sensitivity profile, and the touch report data include data selected from a group consisting of data representing a sensed pressure profile exerted on the touch display module, data representing a finger print of a user, data representing a palm print, data representing an ear image, data representing at least one touched location, characteristic data of a finger print, characteristic data of a palm print, and characteristic data of an ear image.

In one embodiment, the control unit includes a timing control unit, a source driver unit, a gate driver unit, a touch driver unit, a touch detection unit, and an information processing unit.

In one embodiment, the touch display module includes an in-cell touch display or an on-cell touch display or an out-cell touch display.

In one embodiment, the touch display module further includes a pressure sensor module.

In one embodiment, the touch display module further includes a finger print detection module.

In one embodiment, the touch display module further includes a pressure sensor module and a finger print detection module.

In one embodiment, the touch detected data are derived from a capacitive touch plane of the touch display module, the touch detected data being raw data or processed data of the raw data.

In one embodiment, the touch detected data include data derived from the pressure sensor module.

In one embodiment, the touch detected data include data derived from the finger print detection module.

In one embodiment, the touch report data further include data representing a change of the sensed pressure profile over time or data representing a change of a sensed touched area over time.

In one embodiment, the touch report data further include data representing a joystick style operation on a touch operation area, and the data representing a joystick style operation are derived according to a change of the sensed pressure profile over time or a change of a sensed touched area over time.

To attain the foregoing objectives, another touch display driving circuit capable of responding to CPU commands is proposed, including:

a first interface for receiving touch configuration data from a CPU;

a second interface for coupling with a touch module, wherein the touch module comprises a touch array selected from a group consisting of a capacitive type touch array, a resistive type touch array, an optical type touch array, an acoustic type touch array, a pressure sensing type touch array, and a radar type touch array, the touch display driving circuit is implemented by a single integrated circuit or by multiple integrated circuits;

a control unit, which executes a touch detection procedure on the touch module via the second interface to derive touch detected data, and processes the touch detected data to generate the touch report data, wherein the touch detection procedure is determined according to the touch configuration data; the touch configuration data includes multiple control bits; and the multiple control bits included in the touch configuration data are used to determine a connection configuration of at least one multiplexer to set a touch resolution profile, and a weighting configuration of at least one touch point to set a touch sensitivity profile; and the touch report data include data selected from a group consisting of data representing a sensed pressure profile exerted on the touch display module, data representing a finger print of a user, data representing a palm print, data representing an ear image, data representing at least one touched location, characteristic data of a finger print, characteristic data of a palm print, and characteristic data of an ear image.

In one embodiment, the touch display driving circuit further includes a third interface for transmitting the touch report data to the CPU.

In one embodiment, the multiple control bits included in the touch configuration data are further used to enable/disable the at least one touch point.

To attain the foregoing objectives, still another touch display driving circuit capable of responding to CPU commands is proposed, including:

a first interface for receiving pixel data and touch configuration data from a CPU and outputting touch report data to the CPU, wherein the first interface transmits data in a serial manner or a parallel manner and the touch configuration data includes multiple control bits;

a second interface for coupling with a touch display module;

a control unit, which drives the touch display module via the second interface to show an image according to the pixel data, executes a touch detection procedure on the touch display module via the second interface to derive touch detected data, and processes the touch detected data to generate the touch report data, wherein the touch detection procedure is determined according to the touch configuration data, the multiple control bits included in the touch configuration data are used to determine a connection configuration of at least one multiplexer to set a touch resolution profile, and a weighting configuration of at least one touch point to set a touch sensitivity profile, and the CPU processes the touch report data to get data representing a sensed pressure profile exerted on the touch display module, or characteristic data of a finger print or a palm or an ear of a user, or data representing a change of the sensed pressure profile over time, or data representing a change of a sensed touched area over time.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 5(*b*) illustrates an embodiment of the driving circuit of FIG. 2 implemented by a driving circuit and a controller.

FIG. 5(*c*) illustrates an embodiment of the driving circuit of FIG. 2 implemented by a pixel driver circuit, a pixel scan controller, and a touch scan driving control circuit.

FIG. 5(*d*) illustrates an embodiment of the driving circuit of FIG. 2 implemented by a pixel scan driving control circuit and a touch scan driving control circuit.

DETAILED DESCRIPTION OF THE PREFERRED EMBODIMENTS

The present invention will be described in more detail hereinafter with reference to the accompanying drawings that show the preferred embodiments of the invention.

Figure 1:
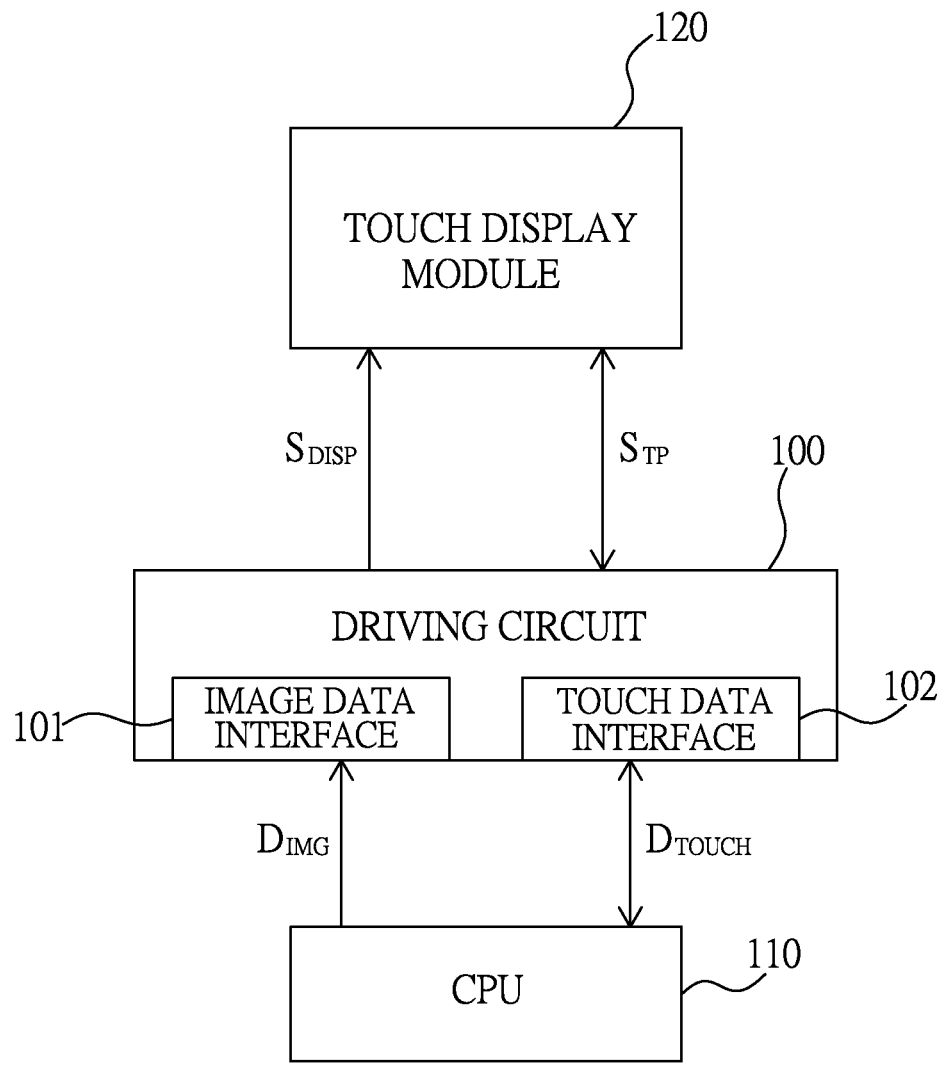
FIG. 1 illustrates a block diagram of a prior art driving architecture of a touch display.
Figure 2:
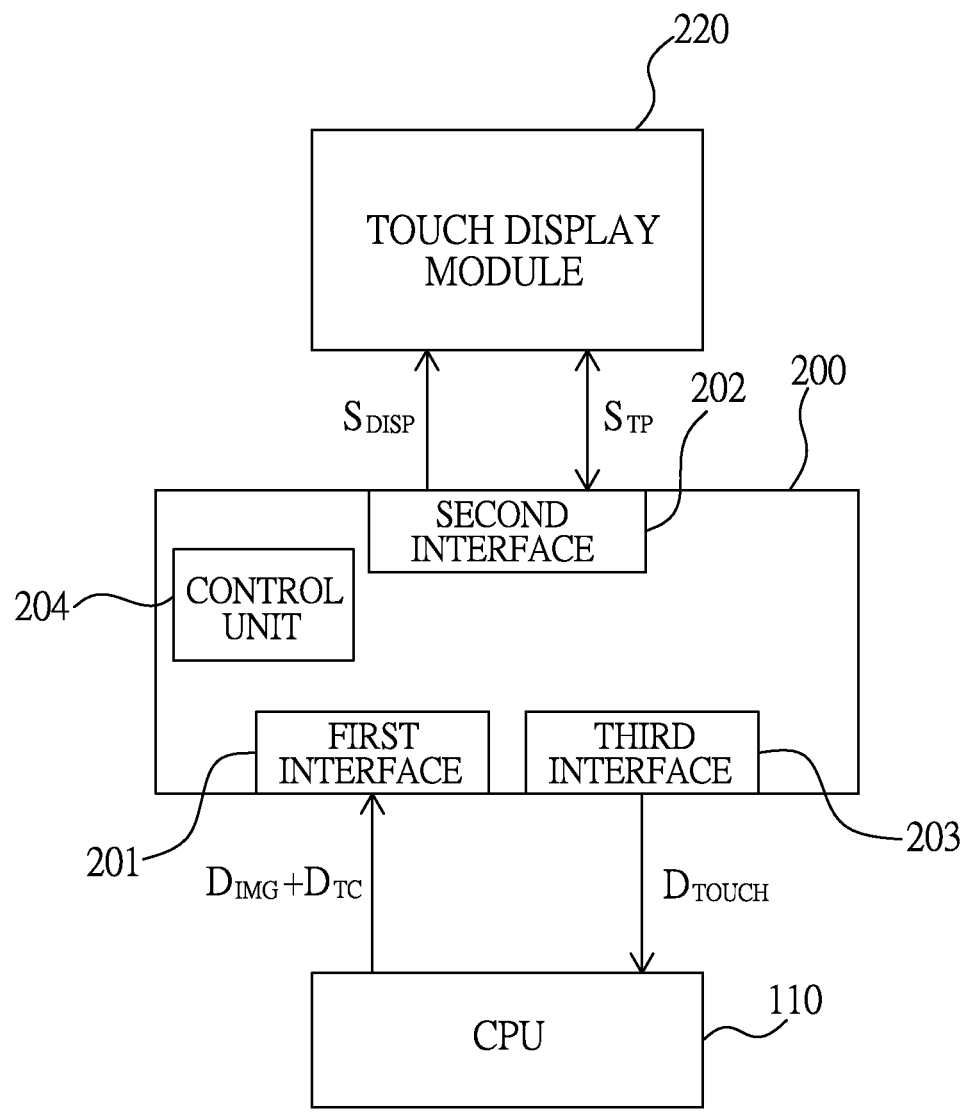
FIG. 2 illustrates a block diagram of a system having a touch/display function, the system including a preferred embodiment of a driving circuit of the present invention.

Please refer to FIG. 2, which illustrates a block diagram of a system having touch/display function, the system including a driving circuit according to a preferred embodiment of the present invention. As illustrated in FIG. 2, a driving circuit 200 is coupled with a CPU 210 and a touch display module 220 respectively, wherein the driving circuit 200 and the touch display module 220 form a touch display, and the CPU 210 can be located in a personal computer, a tablet computer, or any portable information processing device.

The driving circuit 200 has a first interface 201, a second interface 202, a third interface 203, and a control unit 204.

The first interface 201 is used to receive pixel data DIMG and touch configuration data $D_{TC}$ from the CPU 210, wherein the first interface 201 can transmit data in a serial manner or a parallel manner.

The second interface 202 is used to couple with the touch display module 220.

The third interface 203 is used to transmit touch data $D_{TOUCH}$ to CPU 210, wherein the touch data $D_{TOUCH}$ is derived by the control unit 204 during an execution of a touch detection procedure, and the third interface 203 can be an interface of I2C (inter integrated circuit), SPI (serial peripheral interface), 3W (3-wire), USB (universal serial bus), TTL (transistor-transistor logic), or LVDS (low voltage differential signal).

The control unit 204 uses the second interface 202 to drive the touch display module 220 to show an image according to the pixel data $D_{IMG}$, and executes the touch detection procedure on the touch display module 220 via the second interface 202, wherein, the touch detection procedure is determined according to the touch configuration data $D_{TC}$.

Figure 3:
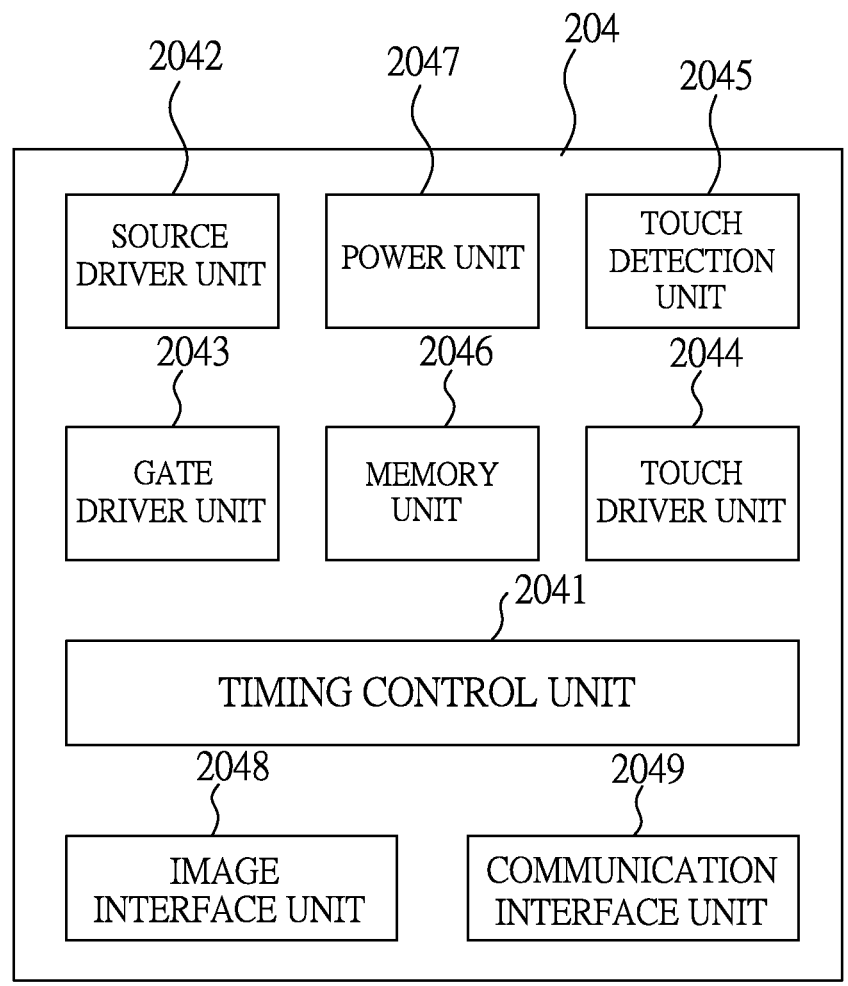
FIG. 3 illustrates a block diagram of a preferred embodiment of a control unit of FIG. 2.

FIG. 3 illustrates a block diagram of a preferred embodiment of the control unit 204. As illustrated in FIG. 3, the control unit 204 has a timing control unit 2041, a source driver unit 2042, a gate driver unit 2043, a touch driver unit 2044, a touch detection unit 2045, a memory unit 2046, a power unit 2047, an image interface unit 2048, and a communication interface unit 2049.

The timing control unit 2041 is used to control an operation timing of the source driver unit 2042, the gate driver unit 2043, the touch driver unit 2044, and the touch detection unit 2045 according to the touch configuration data $D_{TC}$, so as to execute an image display procedure and/or the touch detection procedure.

The memory unit 2046 is used to store the touch data $D_{TOUCH}$.

The power unit 2047 can provide driving voltages for the source driver unit 2042 and the touch driver unit 2044.

The image interface unit 2048 is used to couple with the first interface 201 to receive the pixel data DIMG and the touch configuration data $D_{TC}$ from the CPU 210, and couple with the third interface 203 to transmit the touch data $D_{TOUCH}$ to the CPU 210. The touch data $D_{TOUCH}$ can include touch coordinates, a touch image, and vector information derived from multiple frames of the touch images, wherein the vector information can be used to predict a next touch location.

The communication interface 2049 is used to control data transmission of the first interface 201 and data transmission of the third interface 203.

Figure 4:
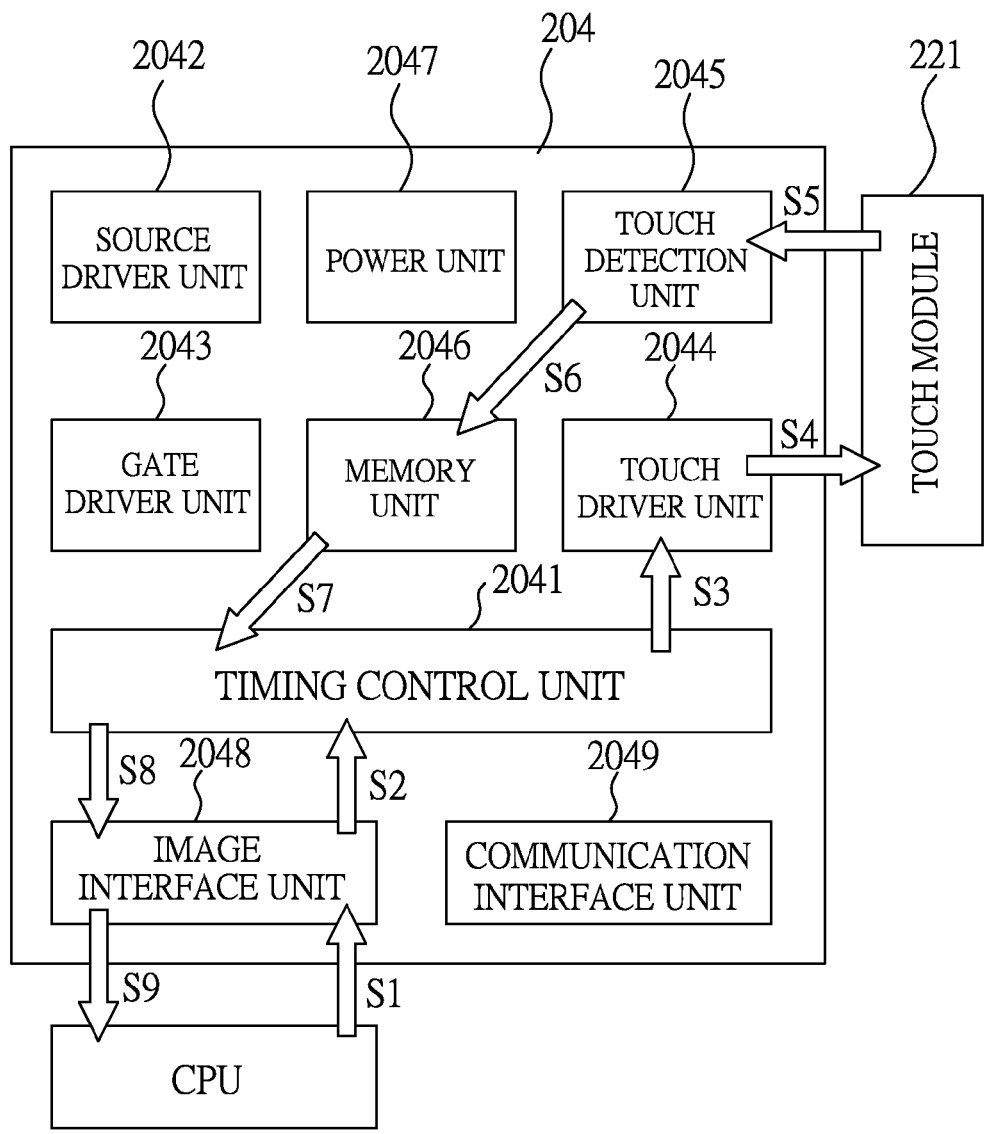
FIG. 4 is an illustrative example of how the control unit of FIG. 3 executes a touch detection procedure.

Please refer to FIG. 4, which is an illustrative example of how the control unit 204 of FIG. 3 executes the touch detection procedure. As illustrated in FIG. 4, in the first step, the CPU 210 transmits the touch configuration data $D_{TC}$ to the image interface unit 2048. In the second step, the image interface unit 2048 transmits the touch configuration data $D_{TC}$ to the timing control unit 2041. In the third step, the timing control unit 2041 makes the touch driver unit 2044 operate in a touch driving mode according to the touch configuration data $D_{TC}$, which includes multiple control bits for determining a connection configuration of at least one multiplexer and a weighting configuration of at least one touch point, and enabling/disabling the at least one touch point. In the fourth step, the touch driver unit 2044 drives a touch module 221 of the touch display module 220, wherein the touch module 221 has a touch array, which is one selected from a group consisting of a capacitive type touch array, a resistive type touch array, an optical type touch array, an acoustic type touch array, a pressure sensing type touch array, and a radar type touch array. In the fifth step, the touch module 221 transmits touch sensing signals to the touch detection unit 2045. In the sixth step, the touch detection unit 2045 transmits touch data, which is derived from the touch sensing signals, to the memory unit 2046. In the seventh step, the timing control unit 2041 reads the touch data from the memory unit 2046. In the eighth step, the timing control unit 2041 transmits the touch data to the image interface unit 2048. In the ninth step, the image interface unit 2048 transmits the touch data to the CPU 210.

In one embodiment, the touch configuration data $D_{TC}$ has 8 control bits $D_0$-$D_7$, wherein, $D_0$ is used to enable/disable at least one touch point; $D_1$-$D_2$ are used to control a connection configuration of at least one multiplexer—the connection configuration of the at least one multiplexer can combine multiple touch points into an effective touch point—to determine at least one touch detection area; $D_3$-$D_4$ are used to control a weighting configuration of at least one touch point to provide a touch discrimination effect, wherein the weighting configuration can alter a signal gain and/or a threshold voltage of the touch detection unit 2045 to generate the touch discrimination effect, and thereby meet a touch request of an application program executed by the CPU 210; and $D_5$-$D_7$ are used to control a charging voltage for at least one touch point. FIG. 6-11 illustrates multiple functions generated by taking advantage of the touch configuration data $D_{TC}$.

Figure 5A:
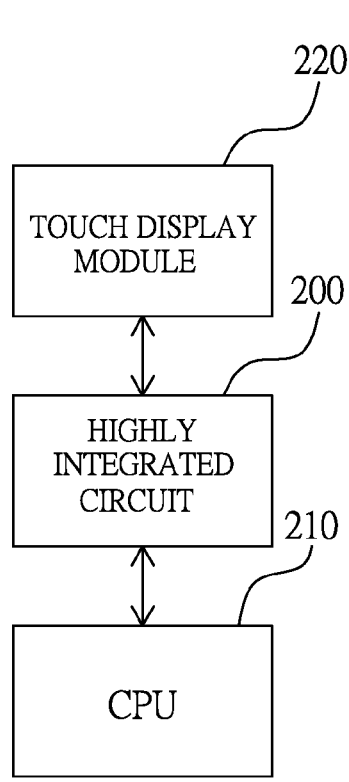
FIG. 5(*a*) illustrates an embodiment of the driving circuit of FIG. 2 implemented by a highly integrated circuit.
Figure 5B:
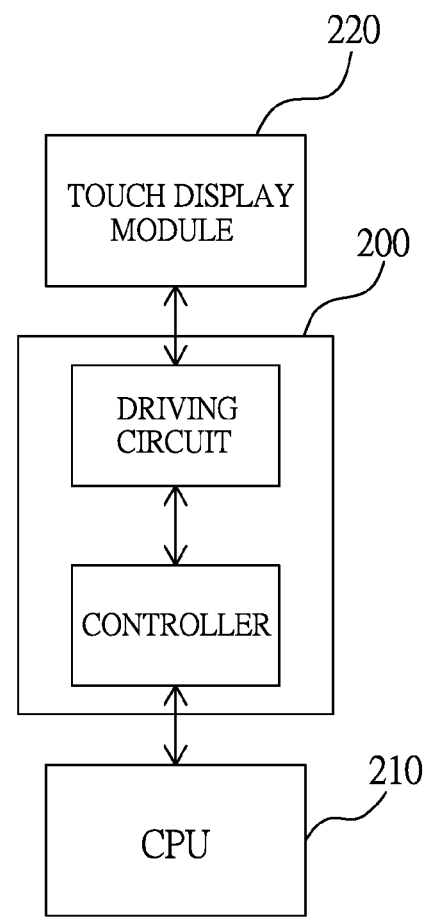
Figure 5C:
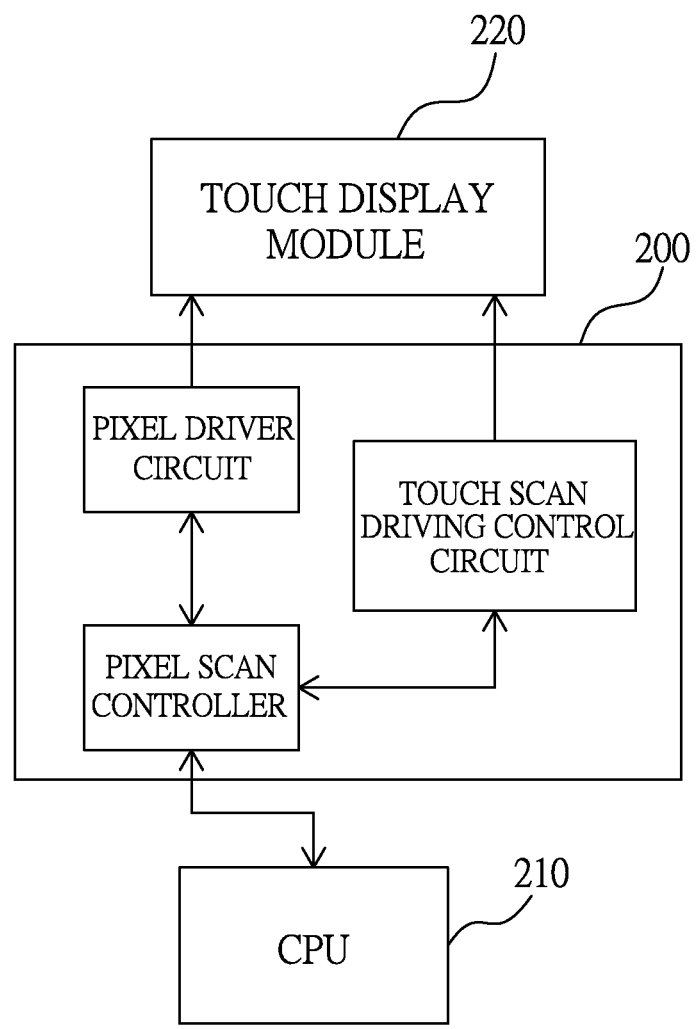
Figure 5D:
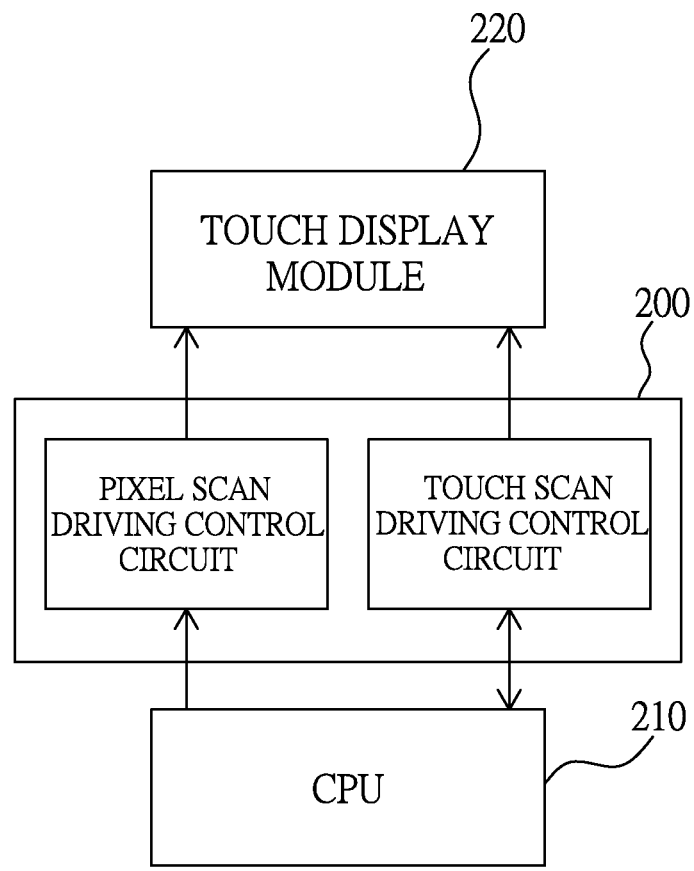

The driving circuit 200 can be implemented by a single integrated circuit or multiple integrated circuits. Please refer to FIG. 5(a)-5(d), wherein FIG. 5(a) illustrates an embodiment of the driving circuit 200 implemented by a highly integrated circuit; FIG. 5(b) illustrates an embodiment of the driving circuit 200 implemented by a driving circuit and a controller; FIG. 5(c) illustrates an embodiment of the driving circuit 200 implemented by a pixel driver circuit, a pixel scan controller, and a touch scan driving control circuit; and FIG. 5(d) illustrates an embodiment of the driving circuit 200 implemented by a pixel scan driving control circuit and a touch scan driving control circuit.

Besides, the touch display module 220 has a flat panel display, which is one selected from a group consisting of a thin-film-transistor display, an organic-light-emitting-diode display, a nanometer-carbon-tube display, a super-twisted-nematic display, and a field-emission display.

Figure 6:
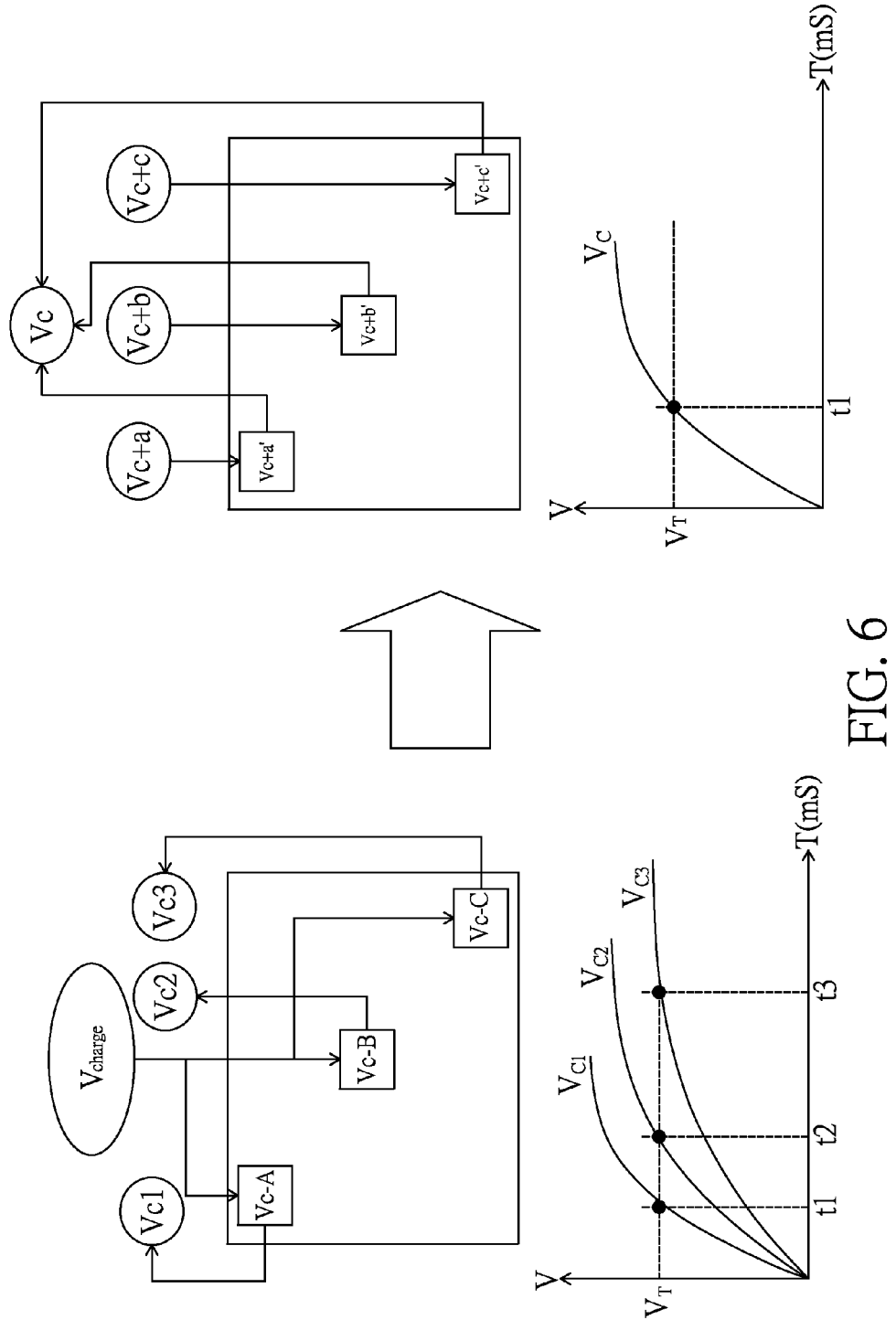
FIG. 6 illustrates a scenario where the control unit of FIG. 2 utilizes touch configuration data to configure a touch detection procedure to provide a resistor-capacitor delay compensation function.

Thanks to the foregoing arrangement, the present invention can provide multiple functions. Please refer to FIG. 6, which illustrates a scenario where the control unit 204 utilizes the touch configuration data $D_{TC}$ to configure the touch detection procedure to provide a resistor-capacitor delay compensation function. As illustrated in FIG. 6, if points A, B, C in a touch array are charged with a same voltage $V_{charge}$, three responding voltages $V_{C1}V_{C2}V_{C3}$ will reach a threshold voltage $V_T$ at different time points t1, t2, and t3. However, by utilizing the touch configuration data $D_{TC}$, the present invention can use three different voltages $V_{c+a}V_{c+b}V_{c+c}$ to charge points A, B, C respectively, so that the three responding voltages reach the threshold voltage $V_T$ at a same time point. By this arrangement, the resistor-capacitor delay compensation function is provided by the touch detection procedure of the present invention.

Figure 7:
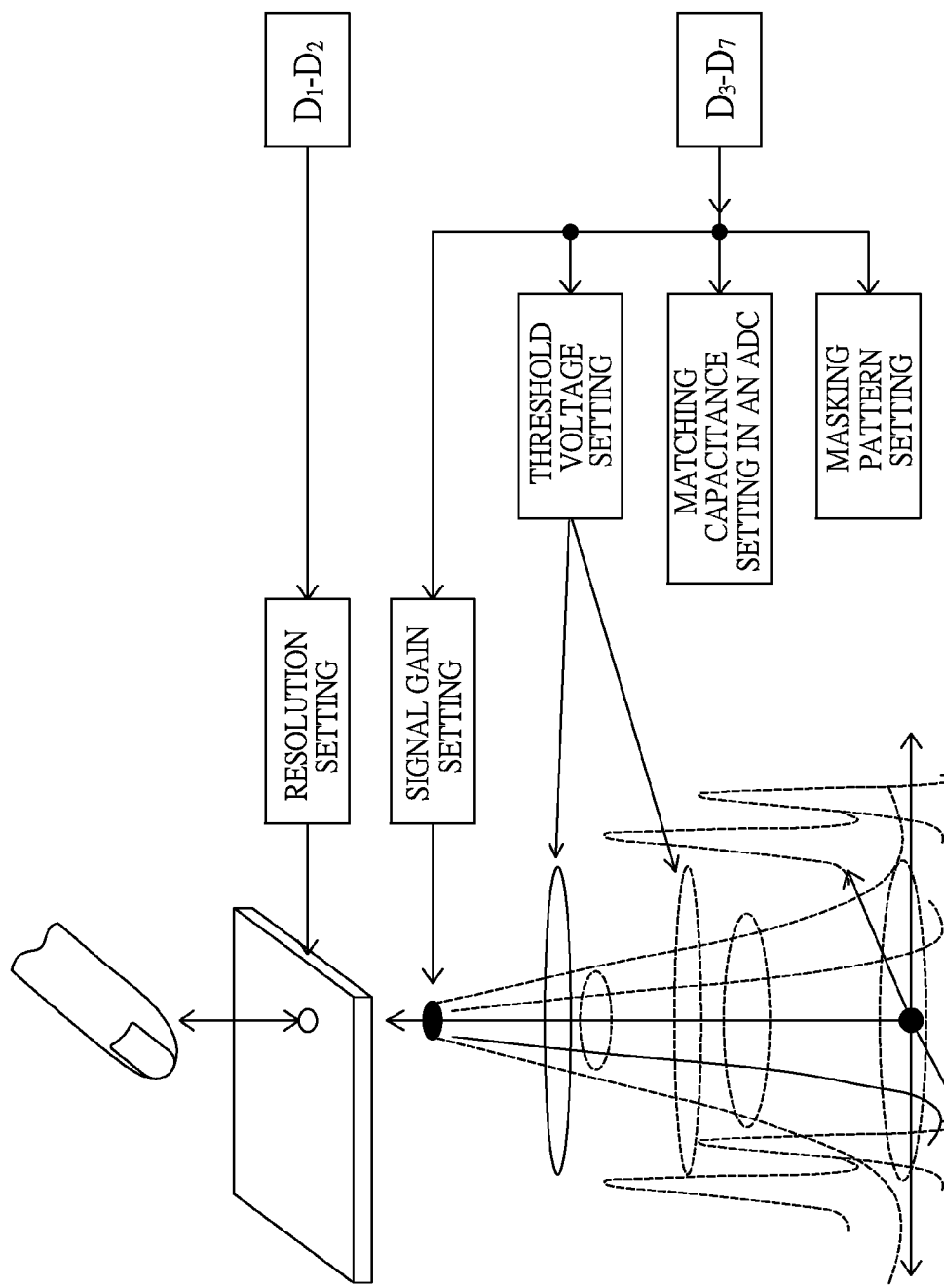
FIG. 7 illustrates a scenario where the control unit of FIG. 2 utilizes touch configuration data to configure a touch detection procedure to provide a dynamic driving function.

Please refer to FIG. 7, which illustrates a scenario where the control unit 204 utilizes the touch configuration data $D_{TC}$ to configure the touch detection procedure to provide a dynamic driving function. As illustrated in FIG. 7, $D_1$-$D_2$ are used to set a resolution of a touch array, and $D_3$-$D_7$ are used to set a signal gain, a threshold voltage, a matching capacitance in an ADC (analog to digital conversion) circuit, and a masking pattern. By this arrangement, the dynamic driving function is provided by the touch detection procedure of the present invention.

Figure 8:
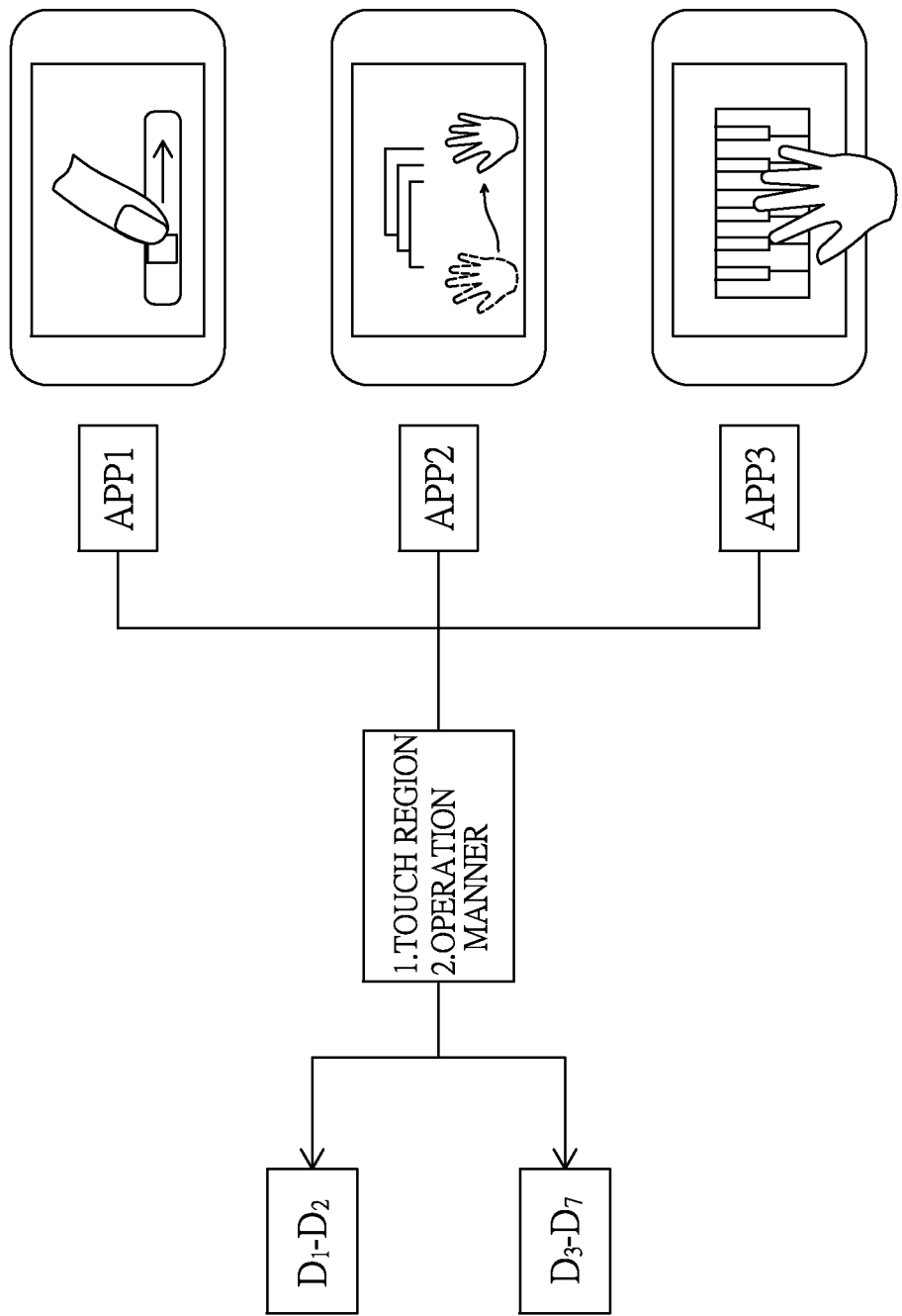
FIG. 8 illustrates a scenario where the control unit of FIG. 2 utilizes touch configuration data to configure a touch detection procedure to provide an adaptive driving function.

Please refer to FIG. 8, which illustrates a scenario where the control unit 204 utilizes the touch configuration data $D_{TC}$ to configure the touch detection procedure to provide an adaptive driving function. As illustrated in FIG. 8, $D_1$-$D_2$ and $D_3$-$D_7$ are generated according to a touch region (by a finger or a palm) and an operation manner (dragging or pressing) demanded by an application program (APP1, APP2, or APP3), to configure the touch detection procedure to provide the adaptive driving function.

Figure 9:
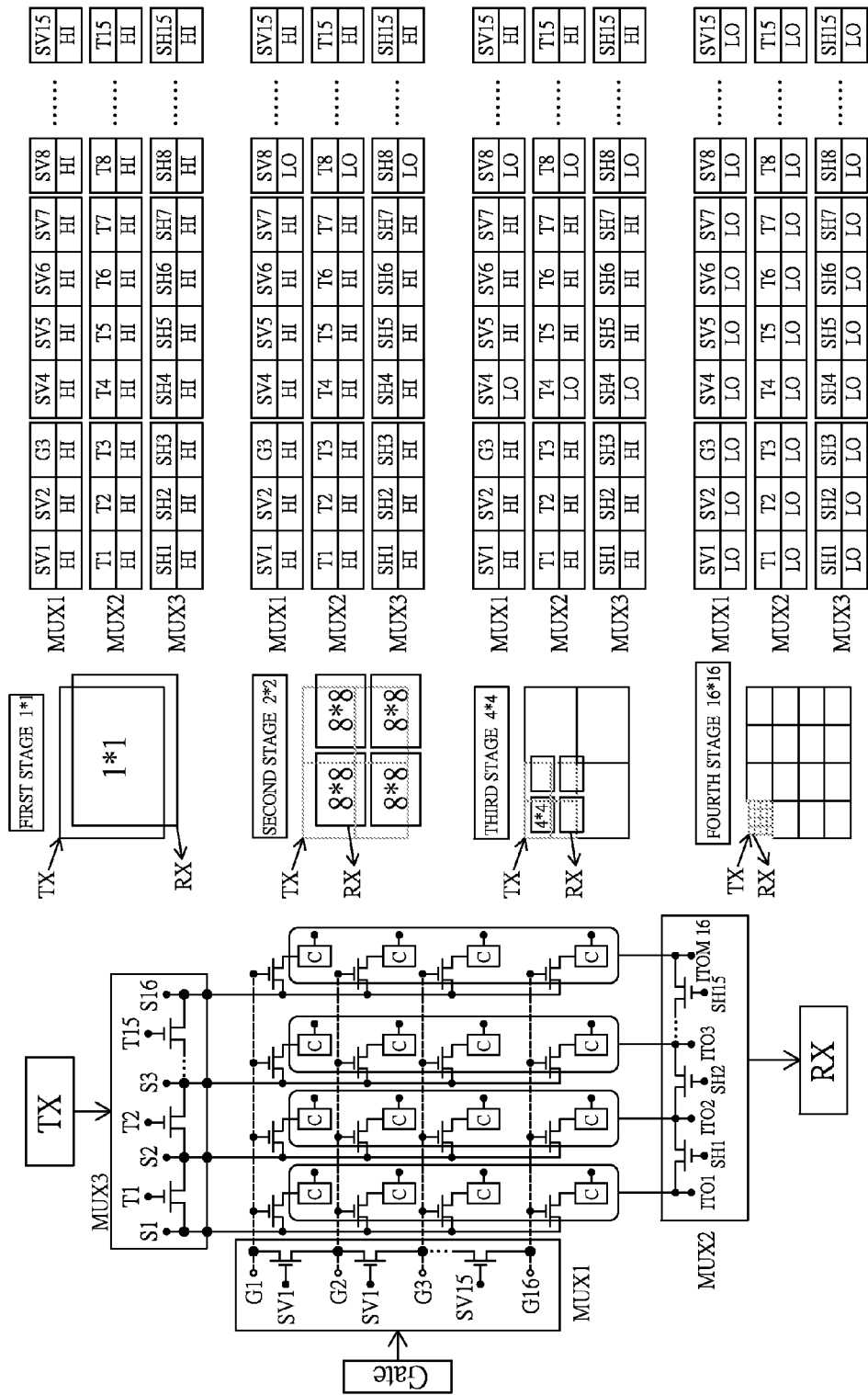
FIG. 9 illustrates a scenario where the control unit of FIG. 2 utilizes touch configuration data to configure a touch detection procedure to provide a multi-stage driving function.
Figure 10:
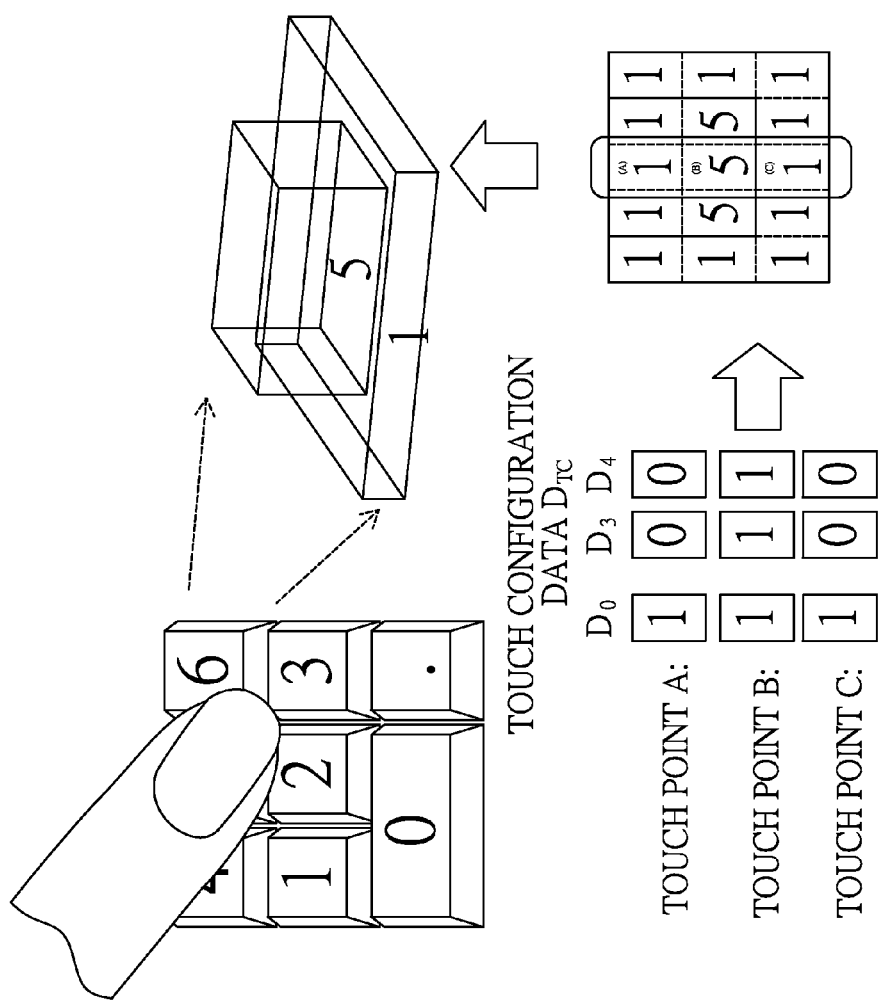
FIG. 10 illustrates a scenario where the control unit of FIG. 2 utilizes touch configuration data to configure a touch detection procedure to provide a three-dimensional touch detection function.

Please refer to FIG. 9, which illustrates a scenario where the control unit 204 utilizes the touch configuration data $D_{TC}$ to configure the touch detection procedure to provide a multi-stage driving function. As illustrated in FIG. 9, by using the touch configuration data $D_{TC}$ to control multiplexers MUX1-MUX3, a touch array is configured to have a resolution of 1*1 at first stage, a resolution of 2*2 at second stage, a resolution of 4*4 at third stage, and a resolution of 16*16 at fourth stage. By this arrangement, the multi-stage driving function is provided by the touch detection procedure of the present invention. Please refer to FIG. 10, which illustrates a scenario where the control unit 204 utilizes the touch configuration data $D_{TC}$ to configure the touch detection procedure to provide a three-dimensional touch detection function. As illustrated in FIG. 10, $D_0$ is used to enable/disable touch points (A, B, C for example) of a 3D GUI button; $D_3$-$D_4$ are used to determine corresponding weighting values of the touch points (A, B, C for example) of the 3D GUI button. By this arrangement, the three-dimensional touch detection function is provided by the touch detection procedure of the present invention.

Figure 11:
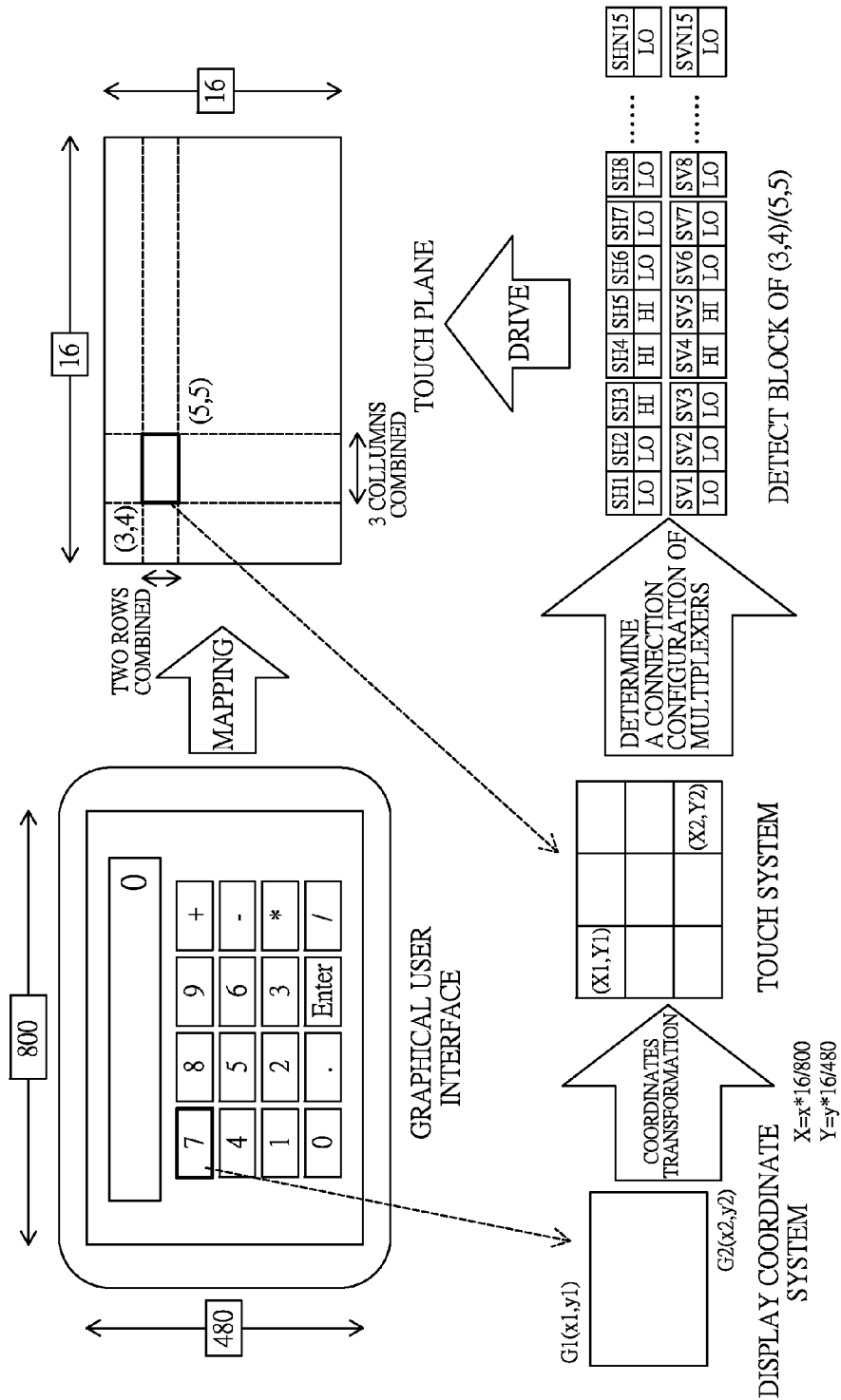
FIG. 11 illustrates a scenario where the control unit of FIG. 2 utilizes touch configuration data to configure a touch detection procedure to provide a graphical user interface touch detection function.

Please refer to FIG. 11, which illustrates a scenario where the control unit 204 utilizes the touch configuration data $D_{TC}$ to configure the touch detection procedure to provide a graphical user interface touch detection function. As illustrated in FIG. 11, a graphical user interface of a resolution of 800*480 is mapped to a touch plane of 16*16. Each button of the graphical user interface has a corresponding area in the touch plane. Take button 7 for example: to detect a touch on the button 7, the touch configuration data $D_{TC}$ can be used to determine a connection configuration of a multiplexer to scan a corresponding area in the touch plane of the button 7. By this arrangement, the graphical user interface touch detection function is provided by the touch detection procedure of the present invention.

FIG. 12(a)-12(d) illustrates four scan control flowcharts with the control unit 204 receiving the pixel data $D_{IMG}$ and the touch configuration data $D_{TC}$ in a parallel way.

Figure 12A:
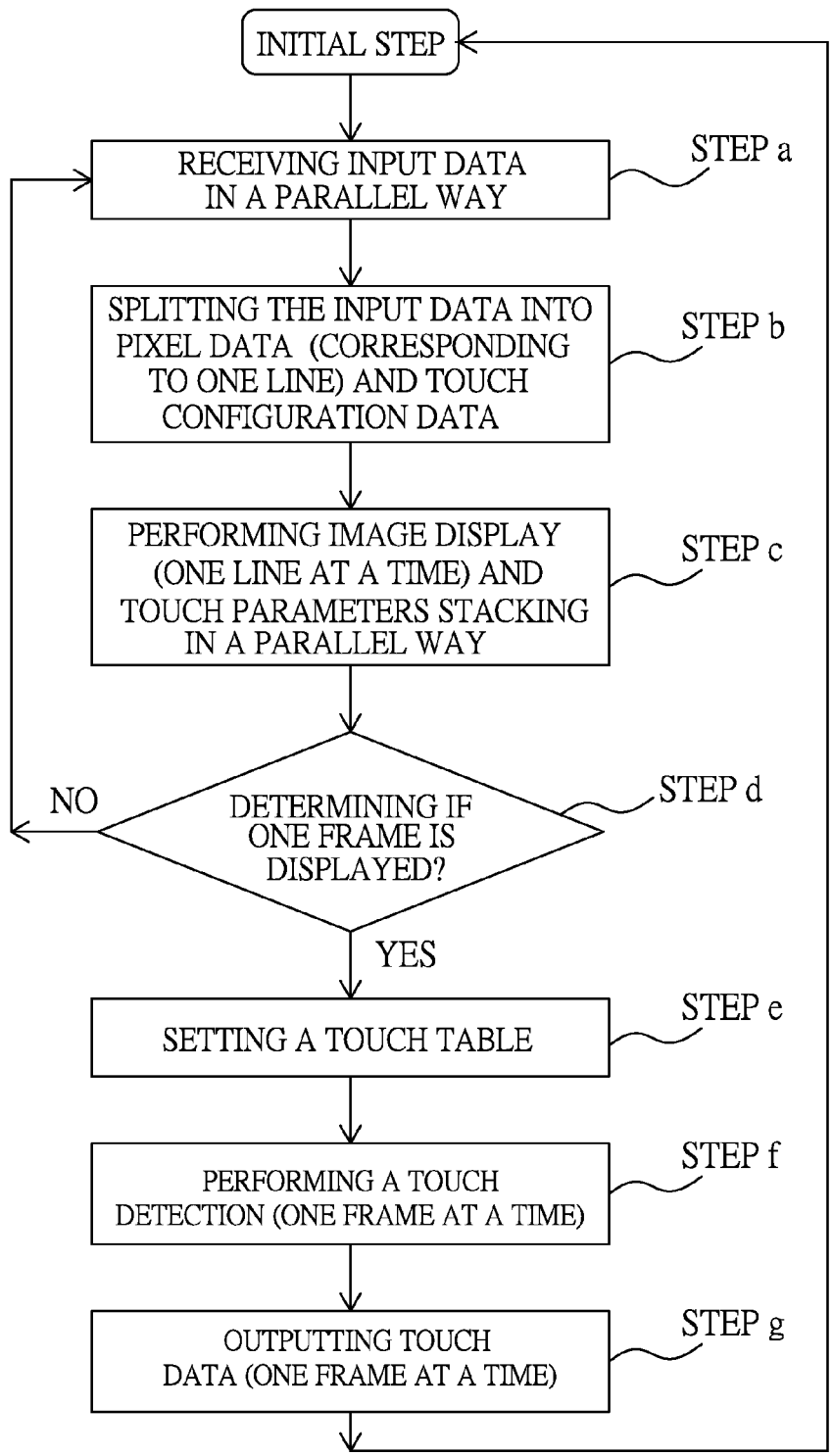
FIG. 12(*a*)-12(*d*) illustrates four scan control flowcharts with the control unit of FIG. 2 receiving pixel data and touch configuration data in a parallel way.

FIG. 12(a) illustrates a scan control flowchart, including: receiving input data in a parallel way (step a); splitting the input data into pixel data (corresponding to one line) and touch configuration data (step b); performing image display (one line at a time) and touch parameters stacking in a parallel way (step c); determining if one frame is displayed? If yes, then go to step e; if no, go to step a (step d); setting a touch table (step e); performing a touch detection (one frame at a time) (step f); and outputting touch data (one frame at a time) (step g).

Figure 12B:
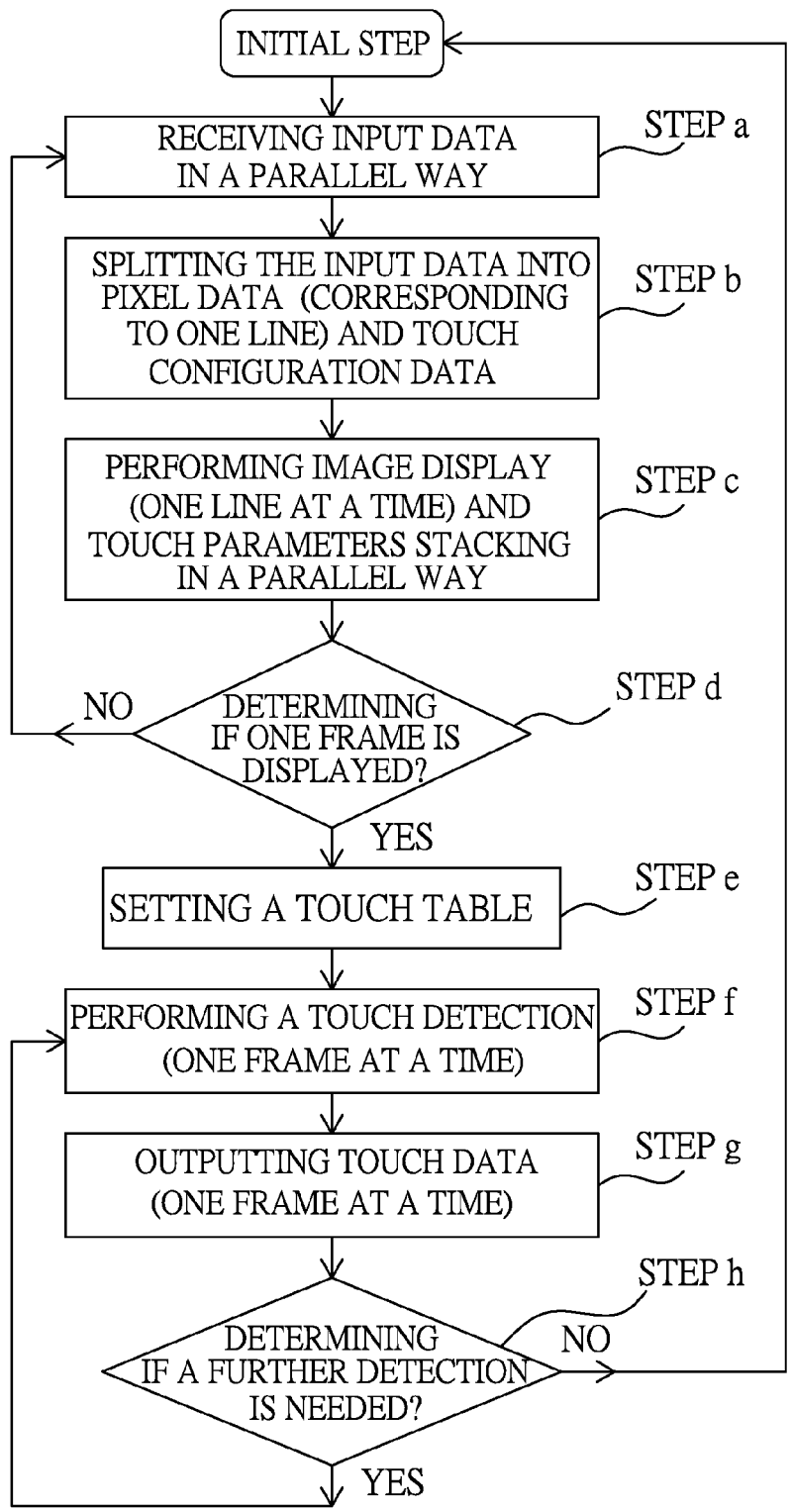

FIG. 12(b) illustrates another scan control flowchart, including: receiving input data in a parallel way (step a); splitting the input data into pixel data (corresponding to one line) and touch configuration data (step b); performing image display (one line at a time) and touch parameters stacking in a parallel way (step c); determining if one frame is displayed? If yes, then go to step e; if no, go to step a (step d); setting a touch table (step e); performing a touch detection (one frame at a time) (step f); outputting touch data (one frame at a time) (step g); and determining if a further detection is needed? If yes, then go to step f; if no, go back to an initial step of this flowchart (step h).

Figure 12C:
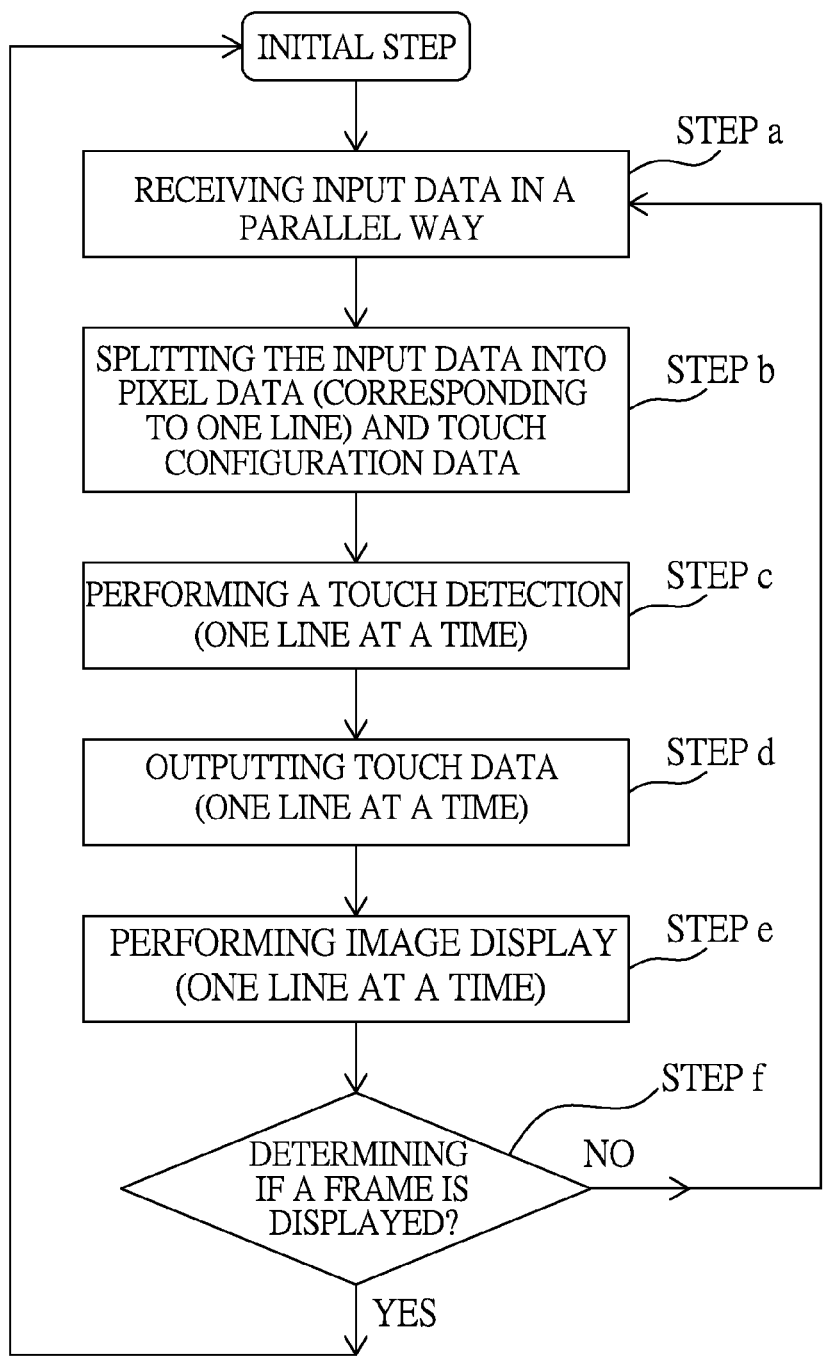

FIG. 12(c) illustrates another scan control flowchart, including: receiving input data in a parallel way (step a); splitting the input data into pixel data (corresponding to one line) and touch configuration data (step b); performing a touch detection (one line at a time) (step c); outputting touch data (one line at a time) (step d); performing image display (one line at a time) (step e); and determining if a frame is displayed? If yes, then go back to an initial step of this flowchart; if no, go to step a (step f).

Figure 12D:
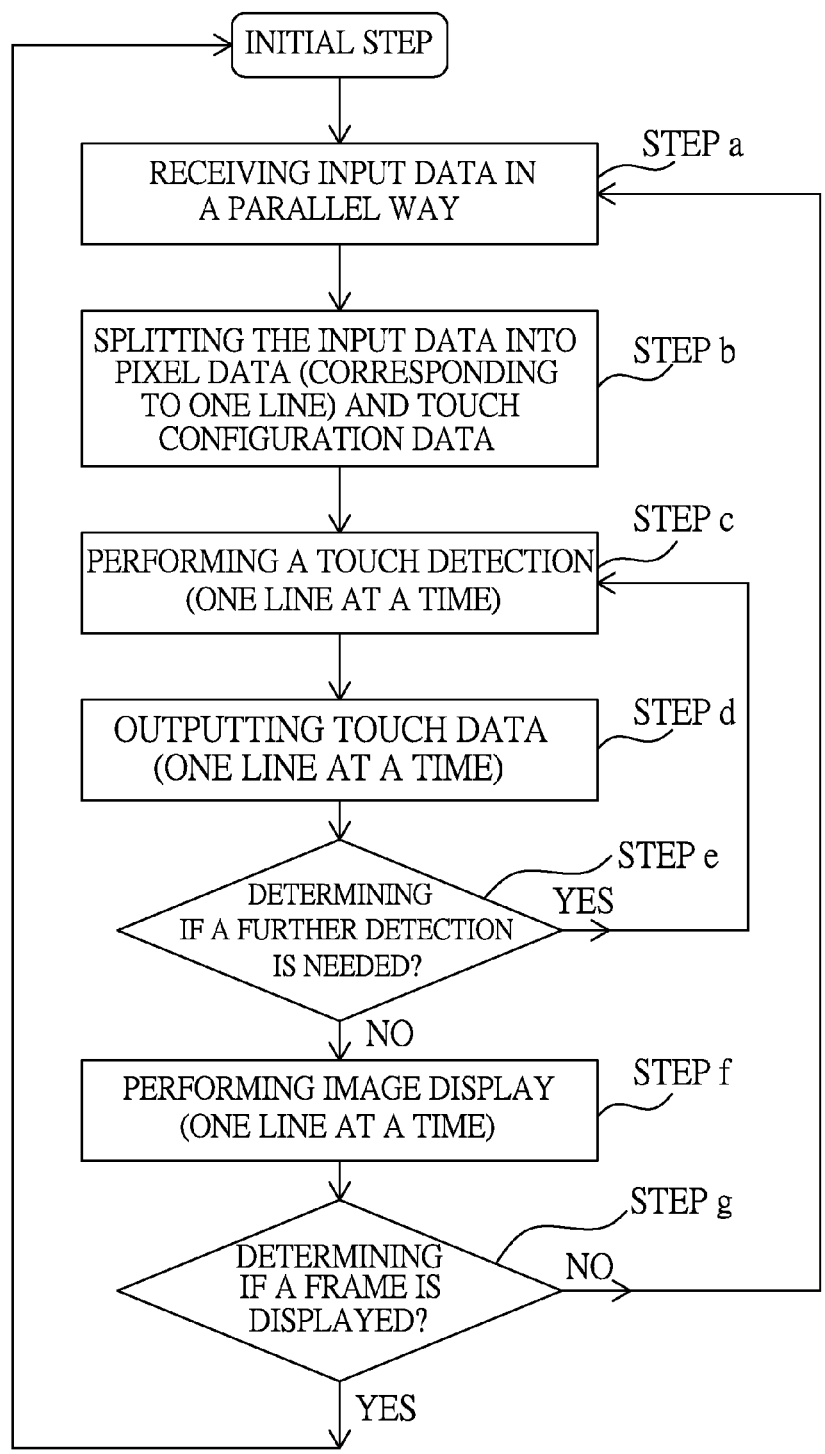

FIG. 12(d) illustrates another scan control flowchart, including: receiving input data in a parallel way (step a); splitting the input data into pixel data (corresponding to one line) and touch configuration data (step b); performing a touch detection (one line at a time) (step c); outputting touch data (one line at a time) (step d); determining if a further detection is needed? If yes, then go to step c; if no, go to step f (step e); performing image display (one line at a time) (step f); and determining if a frame is displayed? If yes, then go back to an initial step of this flowchart; if no, go to step a (step g).

FIG. 13(a)-13(d) illustrates four scan control flowcharts with the control unit 204 receiving the pixel data $D_{IMG}$ and the touch configuration data $D_{TC}$ in a serial way.

Figure 13A:
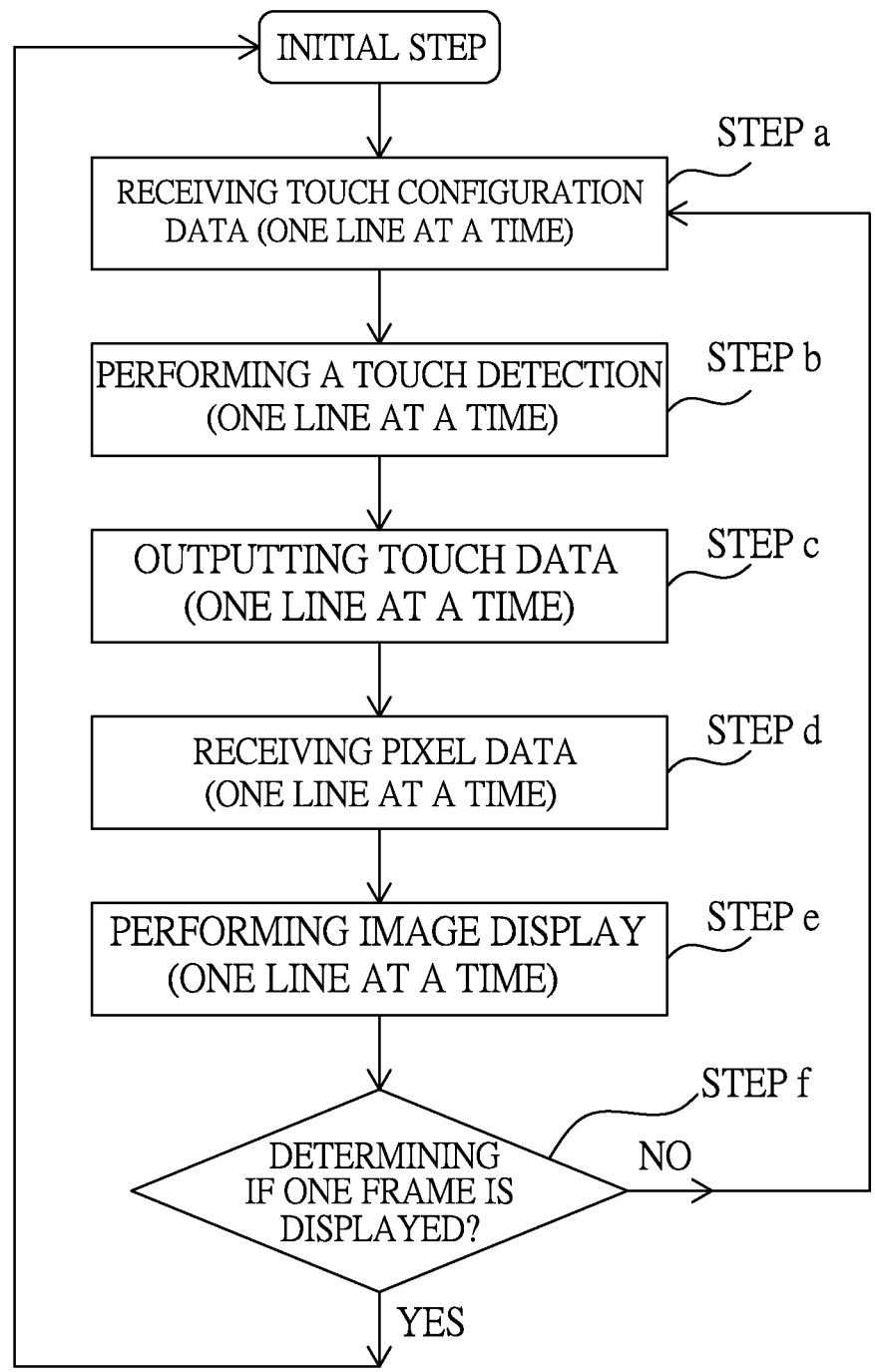
FIG. 13(*a*)-13(*d*) illustrates four scan control flowcharts with the control unit of FIG. 2 receiving pixel data and touch configuration data in a serial way.

FIG. 13(a) illustrates a scan control flowchart, including: receiving touch configuration data (one line at a time) (step a); performing a touch detection (one line at a time) (step b); outputting touch data (one line at a time) (step c); receiving pixel data (one line at a time) (step d); performing image display (one line at a time) (step e); and determining if one frame is displayed? If yes, then go to an initial step of this flowchart; if no, go to step a (step f).

Figure 13B:
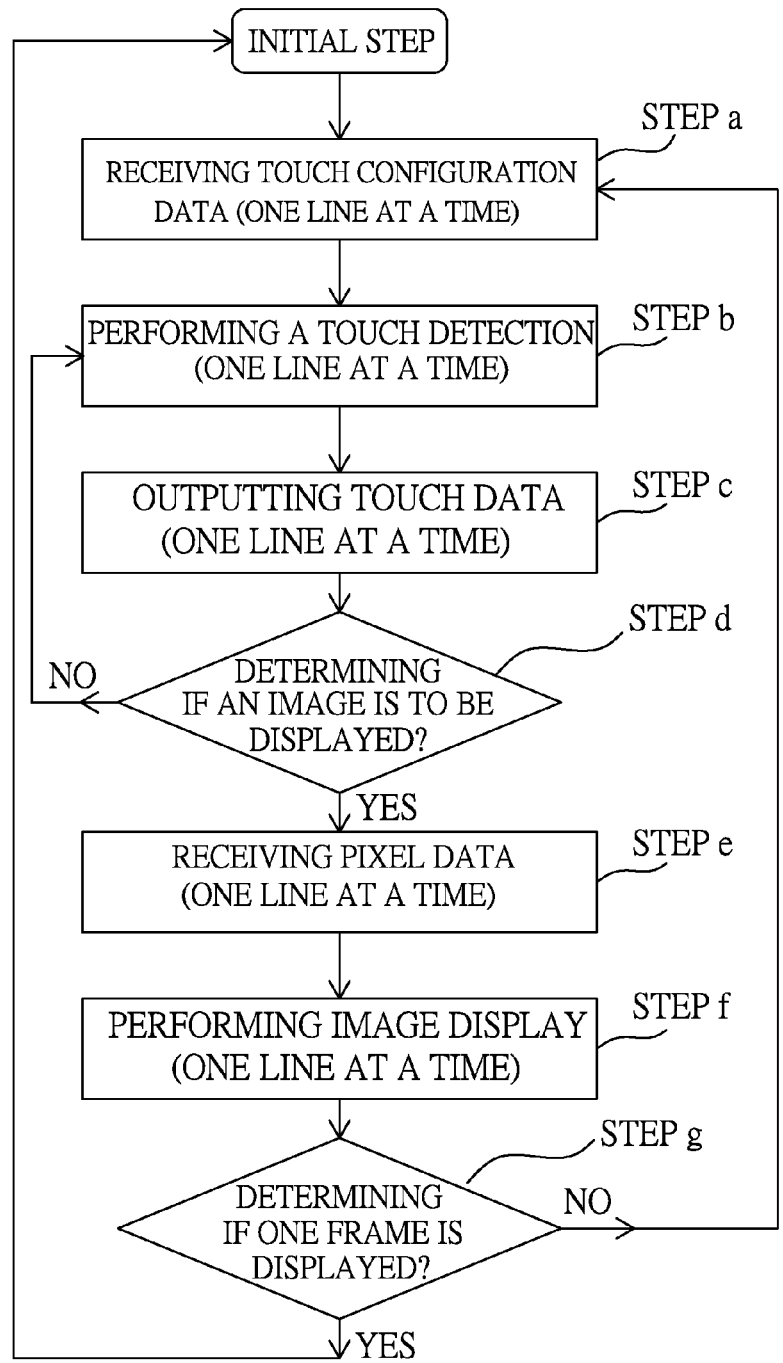

FIG. 13(b) illustrates another scan control flowchart, including: receiving touch configuration data (one line at a time) (step a); performing a touch detection (one line at a time) (step b); outputting touch data (one line at a time) (step c); determining if an image is to be displayed? If yes, then go to step e; if no, go to step b (step d); receiving pixel data (one line at a time) (step e); performing image display (one line at a time) (step f); and determining if one frame is displayed? If yes, then go to an initial step of this flowchart; if no, go to step a (step g).

Figure 13C:
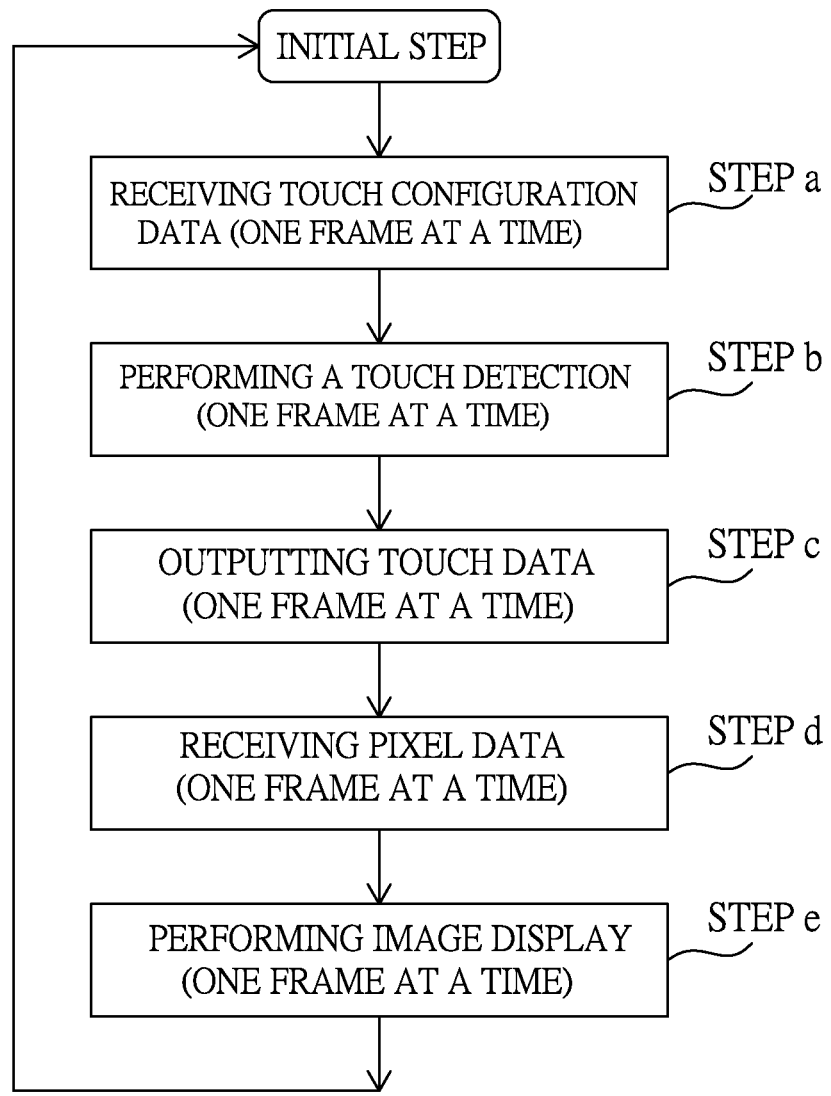

FIG. 13(c) illustrates another scan control flowchart, including: receiving touch configuration data (one frame at a time) (step a); performing a touch detection (one frame at a time) (step b); outputting touch data (one frame at a time) (step c); receiving pixel data (one frame at a time) (step d); and performing image display (one frame at a time) (step e).

Figure 13D:
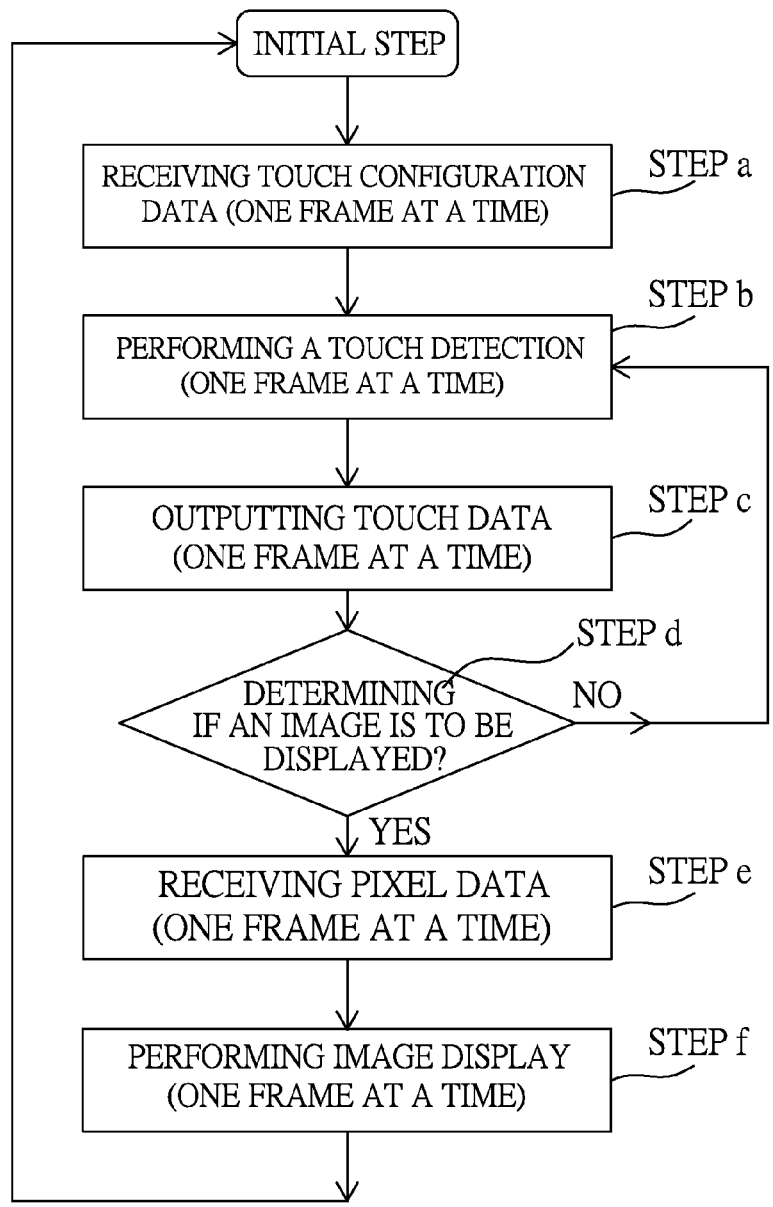

FIG. 13(d) illustrates another scan control flowchart, including: receiving touch configuration data (one frame at a time) (step a); performing a touch detection (one frame at a time) (step b); outputting touch data (one frame at a time) (step c); determining if an image is to be displayed? If yes, then go to step e; if no, go to step b (step d); receiving pixel data (one frame at a time) (step e); and performing image display (one frame at a time) (step f).

In addition to driving a touch display module, the driving circuit of the present invention can also be used to drive a touch module. For example, the touch display driving circuit capable of responding to CPU commands of the present invention can include:

a first interface for receiving touch configuration data from a CPU;

a second interface for coupling with a touch module; and a control unit, which drives the touch module via the second interface to execute a touch detection procedure, wherein the touch detection procedure is determined according to the touch configuration data; and the touch module has a touch array, which is one selected from a group consisting of a capacitive type touch array, a resistive type touch array, an optical type touch array, an acoustic type touch array, a pressure sensing type touch array, and a radar type touch array.

Besides, the touch display driving circuit capable of responding to CPU commands can be implemented by a single integrated circuit or multiple integrated circuits.

The first interface can be used to transmit data in a serial manner or a parallel manner.

The touch configuration data includes multiple control bits.

The multiple control bits can be used to determine a connection configuration of at least one multiplexer, and a weighting configuration of at least one touch point.

The multiple control bits can be further used to enable/disable at least one touch point.

Following the architecture and principle disclosed above, the present invention can be used to implement many touch functions like pressure sensing, finger print verification, palm print verification, ear image verification, or 3 dimensional touch sensing. One embodiment is as follows: a touch display driving circuit capable of responding to CPU commands, including:

a first interface for receiving pixel data and touch configuration data from a CPU and outputting touch report data to the CPU, wherein the first interface transmits data in a serial manner or a parallel manner and the touch configuration data includes multiple control bits;

a second interface for coupling with a touch display module;

a control unit, which drives the touch display module via the second interface to show an image according to the pixel data, executes a touch detection procedure on the touch display module via the second interface to derive touch detected data, and processes the touch detected data to generate the touch report data, wherein the touch detection procedure is determined according to the touch configuration data, the multiple control bits included in the touch configuration data are used to determine a connection configuration of at least one multiplexer to set a touch resolution profile, and a weighting configuration of at least one touch point to set a touch sensitivity profile, and the touch report data include data selected from a group consisting of data representing a sensed pressure profile exerted on the touch display module, data representing a finger print of a user, data representing a palm print, data representing an ear image, data representing at least one touched location, characteristic data of a finger print, characteristic data of a palm print, and characteristic data of an ear image.

The control unit preferably includes a timing control unit, a source driver unit, a gate driver unit, a touch driver unit, a touch detection unit, and an information processing unit.

The touch display module can include an in-cell touch display or an on-cell touch display or an out-cell touch display. The in-cell touch display or on-cell touch display has touch sensors integrated in a display, and the out-cell touch display has touch sensors stacked on a display. The touch detected data can be derived from a capacitive touch plane of the touch display module, and the touch detected data can be raw data or processed data of the raw data, wherein the raw data correspond to capacitance values detected on the capacitive touch plane.

The touch display module can further include a pressure sensor module and/or a finger print detection module, and the touch detected data can include data derived from the pressure sensor module and/or data derived from the finger print detection module.

The touch report data can further include data representing a change of the sensed pressure profile over time and/or data representing a change of a sensed touched area over time.

In addition, the touch report data can further include data representing a joystick style operation on a touch operation area, and the data representing a joystick style operation are derived according to a change of the sensed pressure profile over time or a change of a sensed touched area over time.

Figure 14A:
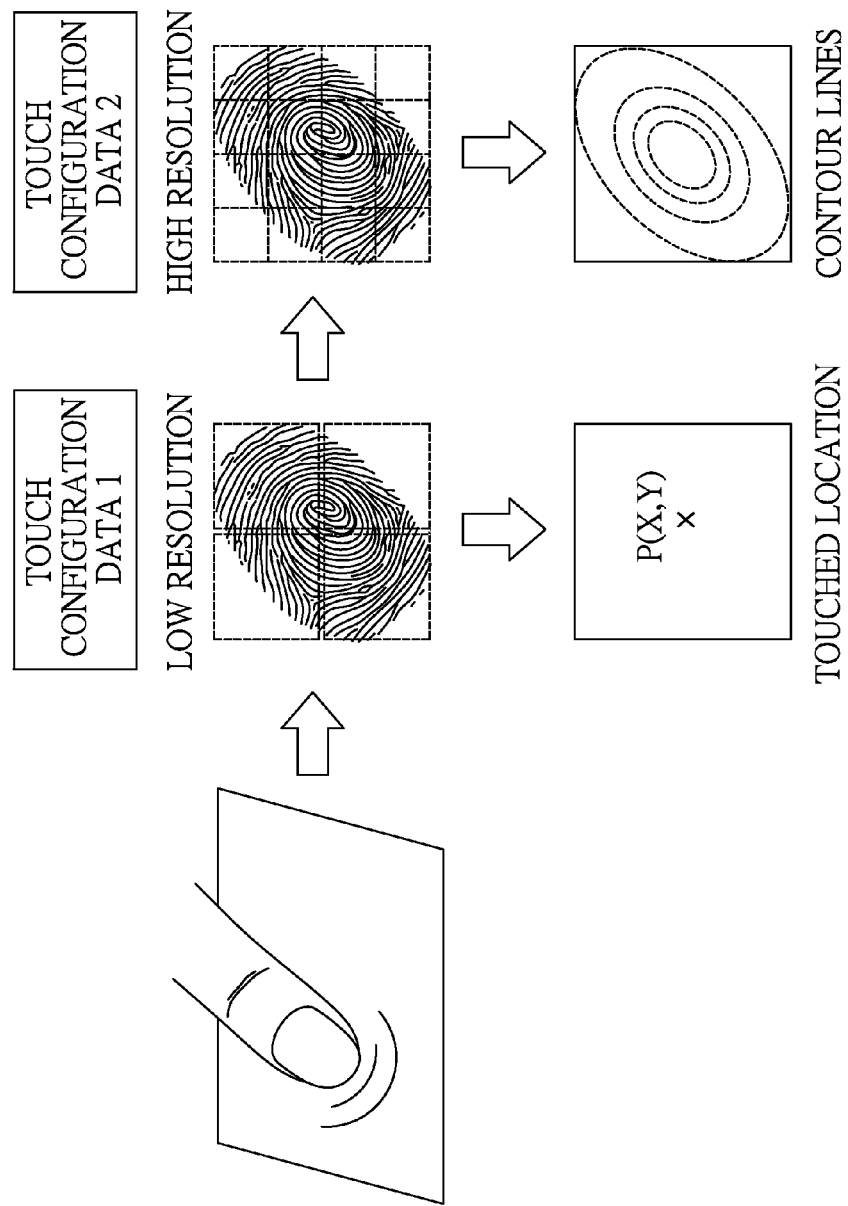
FIG. 14(a)-14(e) illustrates various functions that can be offered by the configurable touch resolution profile and the configurable touch sensitivity profile of the present invention.
Figure 14B:
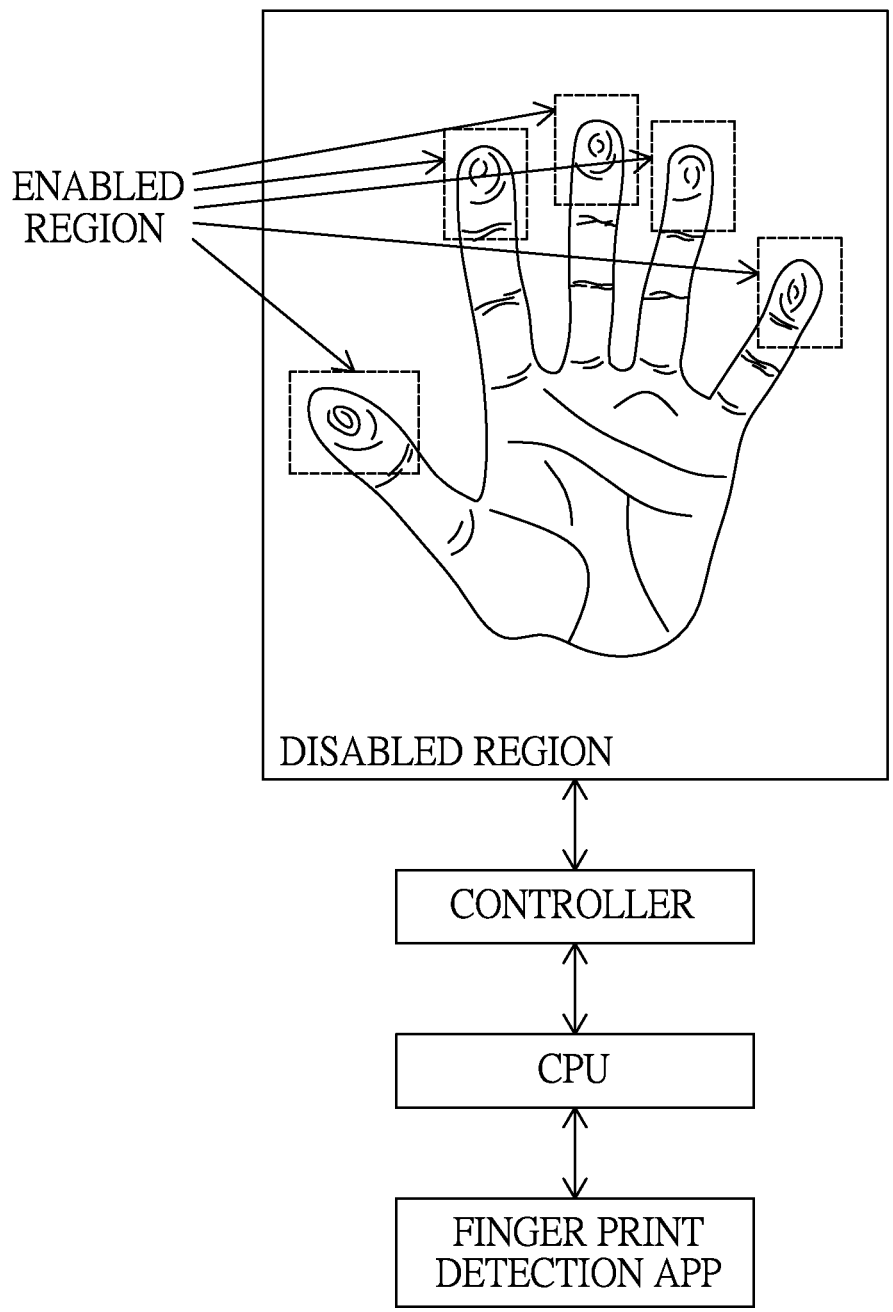
Figure 14C:
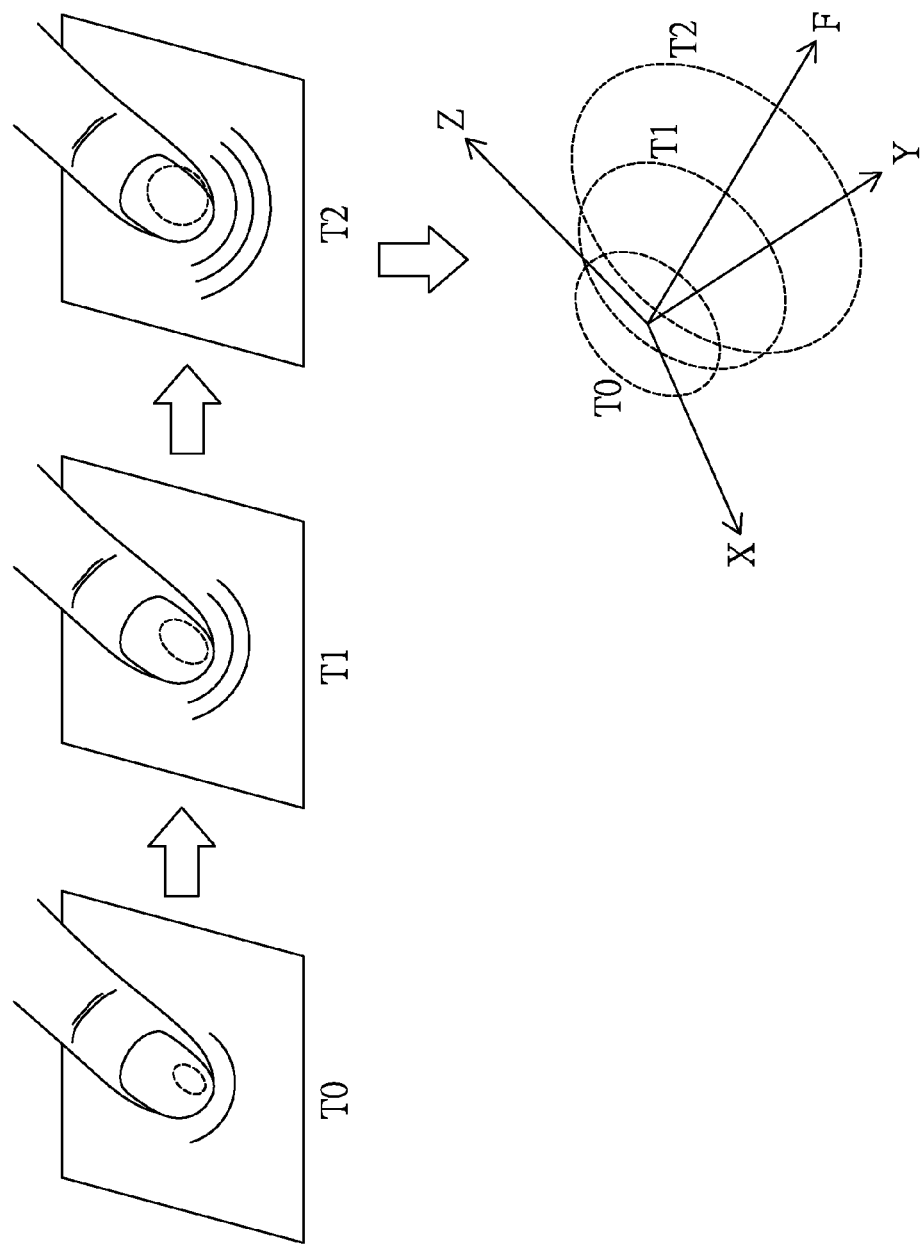
Figure 14D:
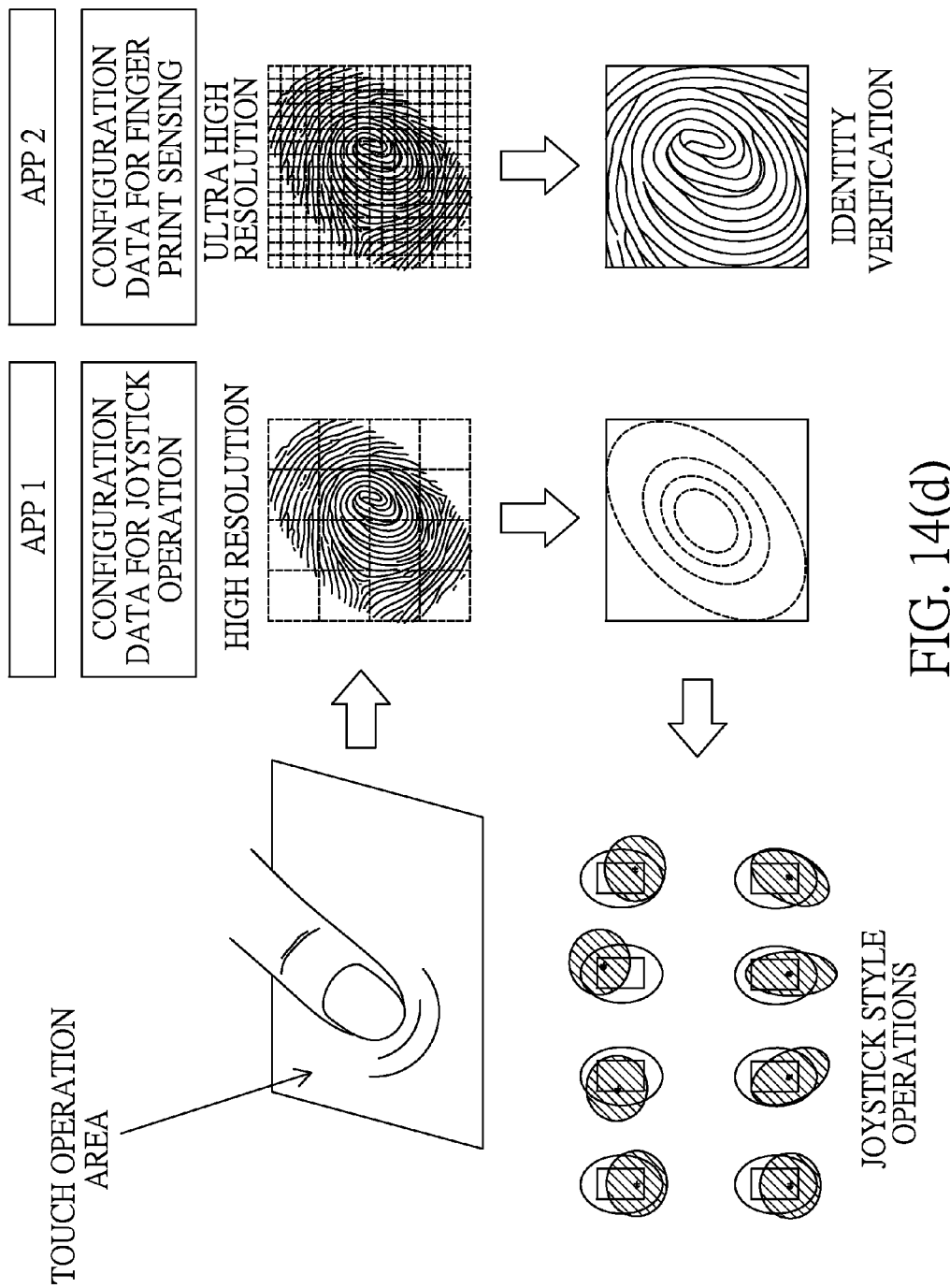
Figure 14E:
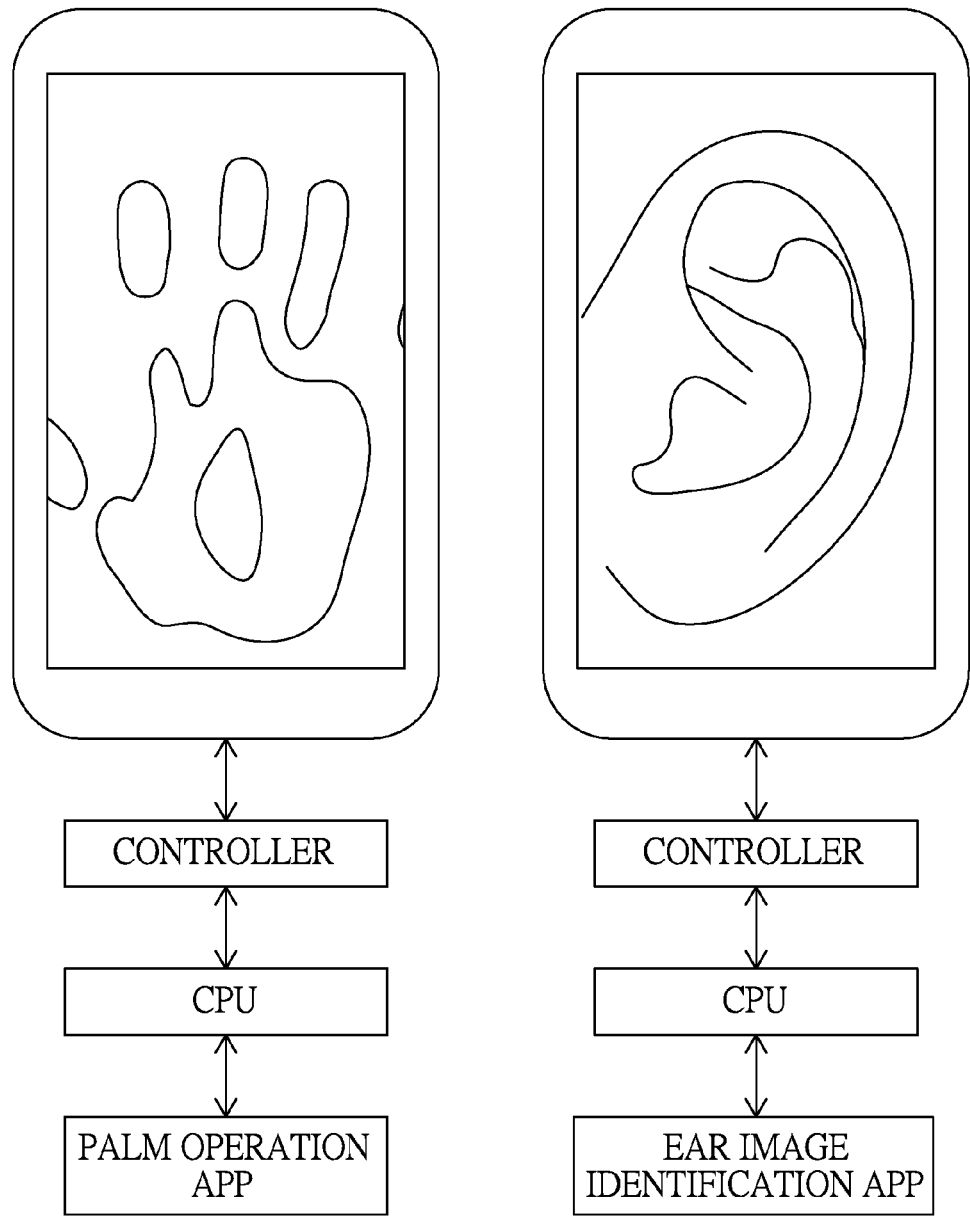

Please refer to FIG. 14(a)-14(e), which illustrates various functions that can be offered by the configurable touch resolution profile and the configurable touch sensitivity profile of the present invention. As illustrated in FIG. 14(a), by controlling the touch resolution profile and/or the touch sensitivity profile of a touch plane (the touch resolution profile is controlled by determining a connection configuration of at least one multiplexer), a touched location or a profile of contour lines of sensed values can be derived. As illustrated in FIG. 14(b), by enabling/disabling the touch operation regions of a touch plane (the enabling/disabling function is controlled by determining a weighting configuration of at least one touch point), five finger prints can be derived. As illustrated in FIG. 14(c), by controlling the touch resolution profile and the sensitivity profile of a touch plane (the touch resolution profile is controlled by determining a connection configuration of at least one multiplexer), multiple profiles of contour lines of sensed values can be derived to form a 3 dimensional profile. As illustrated in FIG. 14(d), by controlling the touch resolution profile of a touch plane (the touch resolution profile is controlled by determining a connection configuration of at least one multiplexer) according to two different APPs (application program), a change of a profile of contour lines of sensed values over time can be derived for detecting a joystick style operation for APP1, and another profile of contour lines of sensed values can be derived for identifying a finger print for APP2. As illustrated in FIG. 14(e), by utilizing the architecture of the present invention, a palm image or an ear image can be derived for identification verification of a user.

To release the workload of the control unit, some processing jobs can be transferred to the CPU side, and one embodiment is as follows: a touch display driving circuit capable of responding to CPU commands, including:

a first interface for receiving pixel data and touch configuration data from a CPU and outputting touch report data to the CPU, wherein the first interface transmits data in a serial manner or a parallel manner and the touch configuration data includes multiple control bits;

a second interface for coupling with a touch display module;

a control unit, which drives the touch display module via the second interface to show an image according to the pixel data, executes a touch detection procedure on the touch display module via the second interface to derive touch detected data, and processes the touch detected data to generate the touch report data, wherein the touch detection procedure is determined according to the touch configuration data, the multiple control bits included in the touch configuration data are used to determine a connection configuration of at least one multiplexer to set a touch resolution profile, and a weighting configuration of at least one touch point to set a touch sensitivity profile, and the CPU processes the touch report data to get data representing a sensed pressure profile exerted on the touch display module, or characteristic data of a finger print or a palm or an ear of a user, or data representing a change of the sensed pressure profile over time, or data representing a change of a sensed touched area over time.

Thanks to the novel designs mentioned above, the present invention possesses the following advantages:

1. The driving circuit of the present invention can configure and execute a touch detection procedure according to a CPU's commands.

2. The driving circuit of the present invention can receive a touch configuration data from a CPU, wherein the touch configuration data has multiple control bits for determining a connection configuration of at least one multiplexer and a weighting configuration of at least one touch point.

3. The driving circuit of the present invention can receive a touch configuration data from a CPU, wherein the touch configuration data has at least one control bit for enabling/disabling at least one touch point.

4. The driving circuit of the present invention can receive a touch configuration data from a CPU, and use the touch configuration data to provide a resistor-capacitor delay compensation function.

5. The driving circuit of the present invention can receive a touch configuration data from a CPU, and use the touch configuration data to provide a dynamic driving function.

6. The driving circuit of the present invention can receive a touch configuration data from a CPU, and use the touch configuration data to provide an adaptive driving function.

7. The driving circuit of the present invention can receive a touch configuration data from a CPU, and use the touch configuration data to provide a multi-stage driving function.

8. The driving circuit of the present invention can receive a touch configuration data from a CPU, and use the touch configuration data to provide a three-dimensional touch detection function.

9. The driving circuit of the present invention can receive a touch configuration data from a CPU, and use the touch configuration data to provide a graphical user interface touch detection function.

10. The driving circuit of the present invention can configure a touch resolution profile and a touch sensitivity profile according to a CPU's commands so as to facilitate detecting a pressure profile on a touch operation area and/or a change of the pressure profile over time.

11. The driving circuit of the present invention can configure a touch resolution profile and a touch sensitivity profile according to a CPU's commands so as to facilitate detecting a finger print of a user and/or characteristic data thereof.

12. The driving circuit of the present invention can configure a touch resolution profile and a touch sensitivity profile according to a CPU's commands so as to facilitate detecting a palm print of a user and/or characteristic data thereof.

13. The driving circuit of the present invention can configure a touch resolution profile and a touch sensitivity profile according to a CPU's commands so as to facilitate detecting an ear image of a user and/or characteristic data thereof.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A touch display driving circuit capable of responding to CPU commands, comprising:
    a first interface for receiving pixel data and touch configuration data from a CPU and outputting touch report data to said CPU, wherein said first interface transmits data in a serial manner or a parallel manner and said touch configuration data includes multiple control bits;
    a second interface for coupling with a touch display module;
    a control unit, which drives said touch display module via said second interface to show an image according to said pixel data, executes a touch detection procedure on said touch display module via said second interface to derive touch detected data, and processes said touch detected data to generate said touch report data, wherein said touch detection procedure is determined according to said touch configuration data, said multiple control bits included in said touch configuration data are used to determine a connection configuration of at least one multiplexer to set a touch resolution profile, and a weighting configuration of at least one touch point to set a touch sensitivity profile, and said touch report data include data selected from a group consisting of data representing a sensed pressure profile exerted on said touch display module, data representing a finger print of a user, data representing a palm print, data representing an ear image, data representing at least one touched location, characteristic data of a finger print, characteristic data of a palm print, and characteristic data of an ear image.

2. The touch display driving circuit capable of responding to CPU commands as claim 1, wherein said control unit comprises a timing control unit, a source driver unit, a gate driver unit, a touch driver unit, a touch detection unit, and an information processing unit.

3. The touch display driving circuit capable of responding to CPU commands as claim 2, wherein said touch display module comprises an in-cell touch display or an on-cell touch display or an out-cell touch display.

4. The touch display driving circuit capable of responding to CPU commands as claim 3, wherein said touch display module further comprises a pressure sensor module.

5. The touch display driving circuit capable of responding to CPU commands as claim 4, wherein said touch detected data include data derived from said pressure sensor module.

6. The touch display driving circuit capable of responding to CPU commands as claim 3, wherein said touch display module further comprises a finger print detection module.

7. The touch display driving circuit capable of responding to CPU commands as claim 6, wherein said touch detected data include data derived from said finger print detection module.

8. The touch display driving circuit capable of responding to CPU commands as claim 3, wherein said touch display module further comprises a pressure sensor module and a finger print detection module.

9. The touch display driving circuit capable of responding to CPU commands as claim 1, wherein said touch detected data are derived from a capacitive touch plane of said touch display module, said touch detected data being raw data or processed data of the raw data.

10. The touch display driving circuit capable of responding to CPU commands as claim 1, wherein said control unit uses said touch configuration data to execute said touch detection procedure to provide a dynamic driving function.

11. The touch display driving circuit capable of responding to CPU commands as claim 1, wherein said control unit uses said touch configuration data to execute said touch detection procedure to provide an adaptive driving function.

12. The touch display driving circuit capable of responding to CPU commands as claim 1, wherein said control unit uses said touch configuration data to execute said touch detection procedure to provide a multi-stage driving function.

13. The touch display driving circuit capable of responding to CPU commands as claim 1, wherein said control unit uses said touch configuration data to execute said touch detection procedure to provide a three-dimensional touch detection function.

14. The touch display driving circuit capable of responding to CPU commands as claim 1, wherein said control unit uses said touch configuration data to execute said touch detection procedure to provide a graphical user interface touch detection function.

15. The touch display driving circuit capable of responding to CPU commands as claim 1, wherein said touch report data further include data representing a change of said sensed pressure profile over time or data representing a change of a sensed touched area over time.

16. The touch display driving circuit capable of responding to CPU commands as claim 1, wherein said touch report data further include data representing a joystick style operation on a touch operation area, and said data representing a joystick style operation are derived according to a change of said sensed pressure profile over time or a change of a sensed touched area over time.

17. A touch display driving circuit capable of responding to CPU commands, comprising:
a first interface for receiving touch configuration data from a CPU;
a second interface for coupling with a touch module, wherein said touch module comprises a touch array selected from a group consisting of a capacitive type touch array, a resistive type touch array, an optical type touch array, an acoustic type touch array, a pressure sensing type touch array, and a radar type touch array, said touch display driving circuit is implemented by a single integrated circuit or by multiple integrated circuits;
a control unit, which executes a touch detection procedure on said touch module via said second interface to derive touch detected data, and processes said touch detected data to generate said touch report data, wherein said touch detection procedure is determined according to said touch configuration data; said touch configuration data includes multiple control bits; and said multiple control bits included in said touch configuration data are used to determine a connection configuration of at least one multiplexer to set a touch resolution profile, and a weighting configuration of at least one touch point to set a touch sensitivity profile; and said touch report data include data selected from a group consisting of data representing a sensed pressure profile exerted on said touch display module, data representing a finger print of a user, data representing a palm print, data representing an ear image, data representing at least one touched location, characteristic data of a finger print, characteristic data of a palm print, and characteristic data of an ear image.

18. The touch display driving circuit capable of responding to CPU commands as claim 17, further comprising a third interface for transmitting said touch report data to said CPU.

19. The touch display driving circuit capable of responding to CPU commands as claim 17, wherein said multiple control bits included in said touch configuration data are further used to enable/disable said at least one touch point.

20. A touch display driving circuit capable of responding to CPU commands, comprising:
a first interface for receiving pixel data and touch configuration data from a CPU and outputting touch report data to said CPU, wherein said first interface transmits data in a serial manner or a parallel manner and said touch configuration data includes multiple control bits;
a second interface for coupling with a touch display module;
a control unit, which drives said touch display module via said second interface to show an image according to said pixel data, executes a touch detection procedure on said touch display module via said second interface to derive touch detected data, and processes said touch detected data to generate said touch report data, wherein said touch detection procedure is determined according to said touch configuration data, said multiple control bits included in said touch configuration data are used to determine a connection configuration of at least one multiplexer to set a touch resolution profile, and a weighting configuration of at least one touch point to set a touch sensitivity profile, and said CPU processes said touch report data to get data representing a sensed pressure profile exerted on said touch display module, or characteristic data of a finger print or a palm or an ear of a user, or data representing a change of said sensed pressure profile over time, or data representing a change of a sensed touched area over time.

* * * * *